US012616937B2

(12) United States Patent (10) Patent No.: US 12,616,937 B2
Perreault et al. (45) Date of Patent: May 5, 2026

(54) FILTRATION UNITS AND ASSEMBLY, AND METHODS OF MAKING AND USING SAME

(71) Applicant: Repligen Corporation, Waltham, MA (US)

(72) Inventors: Mark Perreault, Hudson, MA (US); Paul Lowell, Wilmington, MA (US)

(73) Assignee: Repligen Corporation, Waltham, MA (US)

( * ) Notice: Subject to any disclaimer, the term of this patent is extended or adjusted under 35 U.S.C. 154(b) by 554 days.

(21) Appl. No.: 18/166,520

(22) Filed: Feb. 9, 2023

(65) Prior Publication Data

US 2023/0256392 A1 Aug. 17, 2023

Related U.S. Application Data

(60) Provisional application No. 63/310,682, filed on Feb. 16, 2022.

(51) Int. Cl.
B01D 61/18 (2006.01)
B01D 61/14 (2006.01)
(Continued)

(52) U.S. Cl.
CPC ........... B01D 61/18 (2013.01); B01D 61/146 (2022.08); B01D 63/0822 (2022.08); B01D 69/10 (2013.01); B01D 2313/08 (2013.01); B01D 2313/12 (2013.01); B01D 2313/14 (2013.01); B01D 2313/201 (2022.08); (Continued)

(58) Field of Classification Search
None
See application file for complete search history.

(56) References Cited

U.S. PATENT DOCUMENTS 4,340,475 A 7/1982 Kraus et al.
4,715,955 A 12/1987 Friedman
(Continued)

FOREIGN PATENT DOCUMENTS

DE 10337214 B4 1/2013
EP 0904147 B1 6/2004
(Continued)

OTHER PUBLICATIONS

International Search Report for International Application No. PCT/US2023/062241, mailed on Jun. 26, 2023, 24 pages.
(Continued)

*Primary Examiner* — Krishnan S Menon
(74) *Attorney, Agent, or Firm* — KDW Firm PLLC

(57) ABSTRACT

A self-contained filtration assembly with a self-contained filtration cassette therein. The cassette may be formed from one or more layers membranes and spacers (spacers, screens, or combinations thereof) all having the same general shape. The cassette may have a feed inlet path and a retentate outlet path extending through the layers of the cassette within the perimeter of the cassette, and a permeate outlet path between the cassette exterior and the interior of the cassette housing. The housing may have a generally circular or elliptical cross-section. A clamping assembly may hold together the components of the housing, and may be elongated in a direction along the flow path of the feedstream through the cassette. Various port-defining zones defined in the layers of the cassette may be sealed in a manner facilitating assembly of the cassette as well as isolation of the flow paths therein.

17 Claims, 20 Drawing Sheets

(51) Int. Cl.
    *B01D 63/08*      (2006.01)
    *B01D 69/10*      (2006.01)

(52) U.S. Cl.
    CPC .... *B01D 2313/205* (2022.08); *B01D 2313/23* (2013.01); *B01D 2313/44* (2013.01); *B01D 2319/025* (2013.01)

(56) References Cited

U.S. PATENT DOCUMENTS

| | | | |
|---|---|---|---|
| 5,225,080 | A | 7/1993 | Karbachsch |
| 5,422,057 | A | 6/1995 | Karbachsch et al. |
| 5,824,217 | A | 10/1998 | Pearl |
| 5,922,200 | A | 7/1999 | Pearl |
| 6,319,306 | B1 | 11/2001 | Edlund |
| 6,524,513 | B1 | 2/2003 | Pearl |
| 7,261,817 | B2 | 8/2007 | Requate |
| 7,384,549 | B2 | 6/2008 | de los Reyes |
| 7,828,973 | B2 | 11/2010 | Connors, Jr. |
| 2007/0056894 | A1 | 3/2007 | Connors |
| 2007/0138082 | A1 | 6/2007 | Connors |
| 2015/0014232 | A1 | 1/2015 | Mcginnis et al. |
| 2021/0197125 | A1 | 7/2021 | Perreault |

FOREIGN PATENT DOCUMENTS

| | | | |
|---|---|---|---|
| EP | 0980285 | B1 | 1/2005 |
| EP | 2701828 | B1 | 1/2016 |
| EP | 3708835 | A1 | 9/2020 |
| JP | 2008100224 | A | 5/2008 |
| WO | 2007075862 | A2 | 7/2007 |
| WO | 2017003625 | A1 | 1/2017 |

OTHER PUBLICATIONS

Extended European Search Report in EP Application No. 23710603.4 dated Oct. 8, 2025, 18 pages.

FILTRATION UNITS AND ASSEMBLY, AND METHODS OF MAKING AND USING SAME

CROSS-REFERENCE TO RELATED APPLICATIONS

This is a non-provisional of, and claims the benefit of the filing date of, U.S. provisional patent application No. 63/310,682, filed Feb. 16, 2022, entitled "Filtration Units and Assembly, and Methods of Making and Using Same," the entirety of which application is incorporated by reference herein.

FIELD

The present disclosure relates generally to the field of filtration devices and methods of making and using same. More particularly, the present disclosure relates to tangential flow filtration units in the form of a cassette, self-contained filtration assemblies, and associated methods of making and using same.

BACKGROUND

Filtration is a process in which membranes are used to separate components in a fluid. Two types of filtration include tangential-flow filtration (TFF), also known as cross-flow filtration (CFF), and direct-flow filtration (DFF) also known as normal-flow filtration (NFF).

Tangential-flow filtration applications use hollow fibers through which fluid to be filtered flows, or cassettes or other plate and frame formats along which fluid to be filter flows. Tangential flow filtration (TFF) cassettes are typically used in the biopharmaceutical industry to concentrate and/or diafilter process streams, such as when a drug substance is manufactured. These plate and frame formats typically incorporate a plurality of flat sheet membranes arranged between external flat plates and manifolds. More specifically, TFF cassettes are generally composed of alternating layers of membranes and spacers or screens bound together with a rigid material, such as a rigid polymer (e.g., an epoxy or engineering polymer or thermoplastic material) or a urethane or silicone. The cassette may be clamped between a flow distribution manifold and set of rigid plates (which may be known as a "plate and frame" design relying on clamping forces on membranes and spacers, generally without the use of adhesives). The manifold generally has three different flow paths: one for the feed, one for the retentate, and two for the permeate/filtrate.

In TFF cassettes, the fluid to be filtered is passed through the inlet of the manifold, into the cassette, and tangentially along one or more filter membranes within the filter unit. The fluid flows tangentially along the first (or upstream) surface of the membranes. A portion of the fluid with particles smaller than the filtration capacity of the membranes passes through (normal to) each of the membranes from the first (or upstream) surface to the second (or downstream) surface, and passes out of the cassette and out one outlet (the permeate/filtrate outlet) of the manifold. Another portion of the fluid, with particles too large to pass through the membranes (e.g., particulates, macromolecules, cells, virus, etc.), passes tangentially along the first surface of the membranes, through the cassette and out another outlet of the manifold as retentate, without passing through the membranes. The retentate stream may be discarded, recycled back into the feed stream for further filtering, retained (e.g., if useful in itself), etc., as appropriate.

Those of ordinary skill in the art recognize the advantages of offering a filtration cassette that is preassembled, as it affords benefits to the end user reducing set-up time and minimizing the chance of contamination. Current designs which build on an industry standard format rely on the use of a flow distribution manifold and require costly/cumbersome stainless-steel holders to clamp the cassette. Alternative self-contained technologies, such as hollow fiber or spiral wound elements, are not comparable in performance to cassettes for downstream operations. Accordingly, there is a need for a self-contained cassette, not requiring further assembly, with comparable performance to a conventional single-use cassette.

SUMMARY

This summary of the disclosure is given to aid understanding, and one of skill in the art will understand that each of the various aspects and features of the disclosure may advantageously be used separately in some instances, or in combination with other aspects and features of the disclosure in other instances. No limitation as to the scope of the claimed subject matter is intended by either the inclusion or non-inclusion of elements, components, or the like in this summary.

In accordance with various principles of the present disclosure, a tangential flow filtration cassette has a first cassette end along an inlet of a feedstream into the tangential flow filtration cassette and a second cassette end along an outlet for permeate of the feedstream. In some embodiments, the tangential flow filtration cassette also includes at least one membrane having a feed-port-defining zone adjacent the first cassette end, a retentate-port-defining zone adjacent the second cassette end, and a permeate-port-defining zone along the sides thereof between the first cassette end and the second cassette end; at least one feed spacer defining a feed channel along an upstream side of the membrane, and having a feed-port-defining zone adjacent the first cassette end, a retentate-port-defining zone adjacent the second cassette end, and a permeate-port-defining zone along the sides thereof between the first end and the second end; and at least one permeate spacer defining a permeate channel along a downstream side of the membrane, and having a feed-port-defining zone adjacent the first cassette end and with sealant extending around the perimeter thereof, a retentate-port-defining zone adjacent the second cassette end thereof and with sealant extending around the perimeter thereof, and a permeate-port-defining zone along the sides thereof between the first end and the second end. In some aspect, each of the at least one membrane, the at least one feed spacer, and the at least one permeate spacer has substantially the same shape about their respective perimeters; the feed-port-defining zones of the at least one membrane, the at least one feed spacer, and the at least one permeate spacer are aligned to define a feed inlet path extending along the first cassette end; the retentate-port-defining zones of the at least one membrane, the at least one feed spacer, and the at least one permeate spacer are aligned to define a retentate outlet path extending along the second cassette end; the permeate-port-defining zones of the at least one membrane, the at least one feed spacer, and the at least one permeate spacer are aligned to define a permeate outlet path extending along at least one of the sides of the tangential flow filtration cassette between the first cassette end and the second cassette end; and a sealant extends around the perimeter of the at least one feed spacer to fluidly isolate feed channels from permeate channels within the tangential flow filtration cassette, whereas the permeate-port-defining zones of the at least one permeate spacer are unsealed and in fluid communication with the permeate outlet path.

In some embodiments, the permeate-port-defining zones of the at least one feed spacer and the at least one permeate spacer are aligned to define a permeate outlet path extending along each side of the tangential flow filtration cassette between the first cassette end and the second cassette end.

In some embodiments, each of the at least one membrane, the at least one feed spacer, and the at least one permeate spacer have a curved shape along the first cassette end and the second cassette end and are flat along the sides thereof extending between the first cassette end and the second cassette end.

In some embodiments, at least one of the spacers includes a screen.

In some embodiments, all membranes and spacers of the cassette are bonded together by an encapsulating sealant formed around the membranes and spacers with a portion of the encapsulating sealant removed from the sides of the permeate spacers to place the permeate channels in fluid communication with the permeate outlet paths along the sides of the tangential flow filtration cassette.

In accordance with various principles of the present disclosure, a tangential flow filtration assembly includes a housing; a tangential flow filtration cassette positioned within the housing and having a first end along an inlet of a feedstream into the tangential flow filtration cassette and a second end along an outlet for permeate of the feedstream from the tangential flow filtration cassette, and defining a flow path for feedstream flowing therethrough from the first end to the second end; and a clamp assembly extending through the housing and the tangential flow filtration cassette and having a cross-sectional shape elongated in the direction of the flow path through the tangential flow filtration cassette.

In some embodiments, the housing further includes a housing top extending generally parallel to the flow path within the tangential flow filtration cassette, a housing bottom extending generally parallel to the flow path within the tangential flow filtration cassette, and a lock ring holding the housing top and the housing bottom together and defining a housing shell around the perimeter of the tangential flow filtration cassette, the clamp assembly holding the housing top and the housing bottom together.

In some embodiments, the first end of the tangential flow filtration cassette is shaped to correspond to the shape of the interior of the housing; the second end of the tangential flow filtration cassette is shaped to correspond to the shape of the interior of the housing; and at least one of the sides of the tangential flow filtration cassette between the first end and the second end is spaced apart from the interior of the housing to define a permeate outlet path along the at least one side of the tangential flow filtration cassette between the exterior of the tangential flow filtration cassette and the interior of the housing. In some embodiments, the housing has a generally circular or elliptical cross-section; the first and second ends of the tangential flow filtration cassette are curved to correspond to the circular shape of the interior of the housing; and at least one of the sides of the tangential flow filtration cassette between the first end and the second end is not curved to correspond to the circular shape of the interior of the housing and thereby defines a permeate outlet path along the at least one side and between the exterior of the tangential flow filtration cassette and the interior of the housing. In some embodiments, the tangential flow filtration cassette includes a stack of at least one membrane, at least one feed spacer, and at least one permeate spacer layered to form the tangential flow filtration cassette; a feed-port-defining zone is defined in each of the at least one membrane, the at least one feed spacer, and the at least one permeate spacer, along the first end of the tangential flow filtration cassette; the feed-port-defining zones of the at least one membrane, the at least one feed spacer, and the at least one permeate spacer together define a feed inlet path through the tangential flow filtration cassette; a retentate-port-defining zone is defined in each of the at least one membrane, the at least one feed spacer, and the at least one permeate spacer, along the second end of the tangential flow filtration cassette; the retentate-port-defining zones of the at least one membrane, the at least one feed spacer, and the at least one permeate spacer together define a retentate outlet path through the tangential flow filtration cassette; a permeate-port-defining zone is defined along the at least one side of each of the at least one membrane, the at least one feed spacer, and the at least one permeate spacer spaced apart from the interior of the housing, between the first end and the second end of the tangential flow filtration cassette; and the permeate-port-defining zones of the at least one membrane, the at least one feed spacer, and the at least one permeate spacer together define a permeate outlet path between the exterior of the tangential flow filtration cassette and the interior of the housing.

In some embodiments, the tangential flow filtration cassette includes a stack of at least one membrane, at least one feed spacer, and at least one permeate spacer layered to form the tangential flow filtration cassette; a feed-port-defining zone is defined in each of the at least one membrane, the at least one feed spacer, and the at least one permeate spacer, along the first end of the tangential flow filtration cassette; the feed-port-defining zones of the at least one membrane, the at least one feed spacer, and the at least one permeate spacer together define a feed inlet path through the tangential flow filtration cassette; a retentate-port-defining zone is defined in each of the at least one membrane, the at least one feed spacer, and the at least one permeate spacer, along the second end of the tangential flow filtration cassette; the retentate-port-defining zones of the at least one membrane, the at least one feed spacer, and the at least one permeate spacer together define a retentate outlet path through the tangential flow filtration cassette; a permeate-port-defining zone is defined along at least one side of each of the at least one membrane, the at least one feed spacer, and the at least one permeate spacer, extending between the first end and the second end of the tangential flow filtration cassette and spaced apart from the interior of the housing; and the permeate-port-defining zones of the at least one membrane, the at least one feed spacer, and the at least one permeate spacer together define a permeate outlet path between the exterior of the tangential flow filtration cassette and the interior of the housing.

In some embodiments, the housing has a generally circular or elliptical cross-section; the tangential flow filtration cassette may include a stack of at least one membrane, at least one feed spacer, and at least one permeate spacer layered to form the tangential flow filtration cassette; a feed-port-defining zone is defined in each of the at least one membrane, at least one feed spacer, and at least one permeate spacer, along the first end of the tangential flow filtration cassette; a retentate-port-defining zone is defined in each of the at least one membrane, at least one feed spacer, and at least one permeate spacer, along the second end of the tangential flow filtration cassette; and at least one side of the tangential flow filtration cassette extending between the first and second ends of the tangential flow filtration cassette is spaced apart from the interior of the housing to define a permeate outlet path along the at least one side between the exterior of the tangential flow filtration cassette and the interior of the housing.

In some embodiments, at least one membrane, at least one feed spacer, and at least one permeate spacer are stacked within the tangential flow filtration cassette with respective feed-port-defining zones, retentate-port-defining zones, and permeate-port-defining zones defined therein aligned to define, respectively, a feed inlet path along the first end of the tangential flow filtration cassette, a retentate outlet path along the second end of the tangential flow filtration cassette, and a permeate outlet path along one or both sides of the tangential flow filtration cassette between the first and second end thereof. In some embodiments, the feed inlet path is in fluid communication with a feed inlet port in the housing, the retentate outlet path is in fluid communication with a retentate outlet port in the housing, and the permeate outlet path along one or both side of the tangential flow filtration cassette is in fluid communication with a respective permeate outlet port in the housing. In some embodiments, at least one of the feed inlet port, the retentate outlet port, and the permeate outlet port is configured to be connected with a sanitary connector and coupled with a fluid line for supplying feedstream to the tangential flow filtration cassette or removing retentate or permeate from the tangential flow filtration cassette.

In some embodiments, the housing includes a feed inlet port, a retentate outlet port, and at least one permeate outlet port, each of which is configured to be coupled directly with sanitary couplers and feed lines to feed feedstream into the tangential flow filtration cassette or remove retentate or permeate from the tangential flow filtration cassette.

In some embodiments, the housing has a circular or elliptical cross-section. Implementations of the described techniques may include hardware, a method or process, or computer software on a computer-accessible medium.

In accordance with various principles of the present disclosure, a method of forming a tangential flow filtration cassette includes stacking at least one membrane, at least one feed spacer, and at least one permeate spacer to form a layered stack; and encapsulating the layered stack with a sealing material to seal the perimeters of the at least one membrane, the at least one feed spacer, and the at least one permeate spacer except along the permeate spacer along at least one side of the tangential flow filtration cassette so that a permeate channel defined by the permeate spacer is in fluid communication with the exterior of the tangential flow filtration cassette along the at least one side of the tangential flow filtration cassette while the perimeter of the at least one feed spacer remains sealed from the exterior of the tangential flow filtration cassette.

In some embodiments, the method includes encapsulating the entire layered stack with a sealing material and then cutting along the at least one side of the tangential flow filtration cassette to cut through sealing material along the permeate spacer along the at least one side of the tangential flow filtration cassette to place the permeate channel therein in fluid communication with the exterior of the tangential flow filtration cassette.

In some embodiments, the method includes forming a permeate channel packet by stacking a permeate spacer and at least one membrane, and forming sealant about a feed-port-defining zone and a retentate-port-defining zone in each of the stacked permeate spacer and at least one membrane. In some embodiments, the method includes stacking the permeate channel packet with at least one feed spacer and encapsulating the layered stack of the permeate channel packet and at least one feed spacer with sealing material, where a feed inlet path defined through the tangential flow filtration cassette is fluidly isolated from the permeate channel packet yet in fluid communication with the feed spacer, a retentate outlet path defined through the tangential flow filtration cassette is fluidly isolated from the permeate channel packet yet in fluid communication with the feed spacer, and a permeate outlet path along the exterior of the tangential flow filtration cassette is fluidly isolated from the feed spacer yet in fluid communication with the permeate channel packet.

These and other features and advantages of the present disclosure, will be readily apparent from the following detailed description, the scope of the claimed invention being set out in the appended claims. While the following disclosure is presented in terms of aspects or embodiments, it should be appreciated that individual aspects can be claimed separately or in combination with aspects and features of that embodiment or any other embodiment.

BRIEF DESCRIPTION OF THE DRAWINGS

Non-limiting embodiments of the present disclosure are described by way of example with reference to the accompanying drawings, which are schematic and not intended to be drawn to scale. The accompanying drawings are provided for purposes of illustration only, and the dimensions, positions, order, and relative sizes reflected in the figures in the drawings may vary. For example, devices may be enlarged so that detail is discernable, but is intended to be scaled down. In the figures, identical or nearly identical or equivalent elements are typically represented by the same reference characters, with redundant description omitted. For purposes of clarity and simplicity, not every element is labeled in every figure, nor is every element of each embodiment shown where illustration is not necessary to allow those of ordinary skill in the art to understand the disclosure.

The detailed description will be better understood in conjunction with the accompanying drawings, wherein like reference characters represent like elements, as follows.

DETAILED DESCRIPTION

Figure 1:
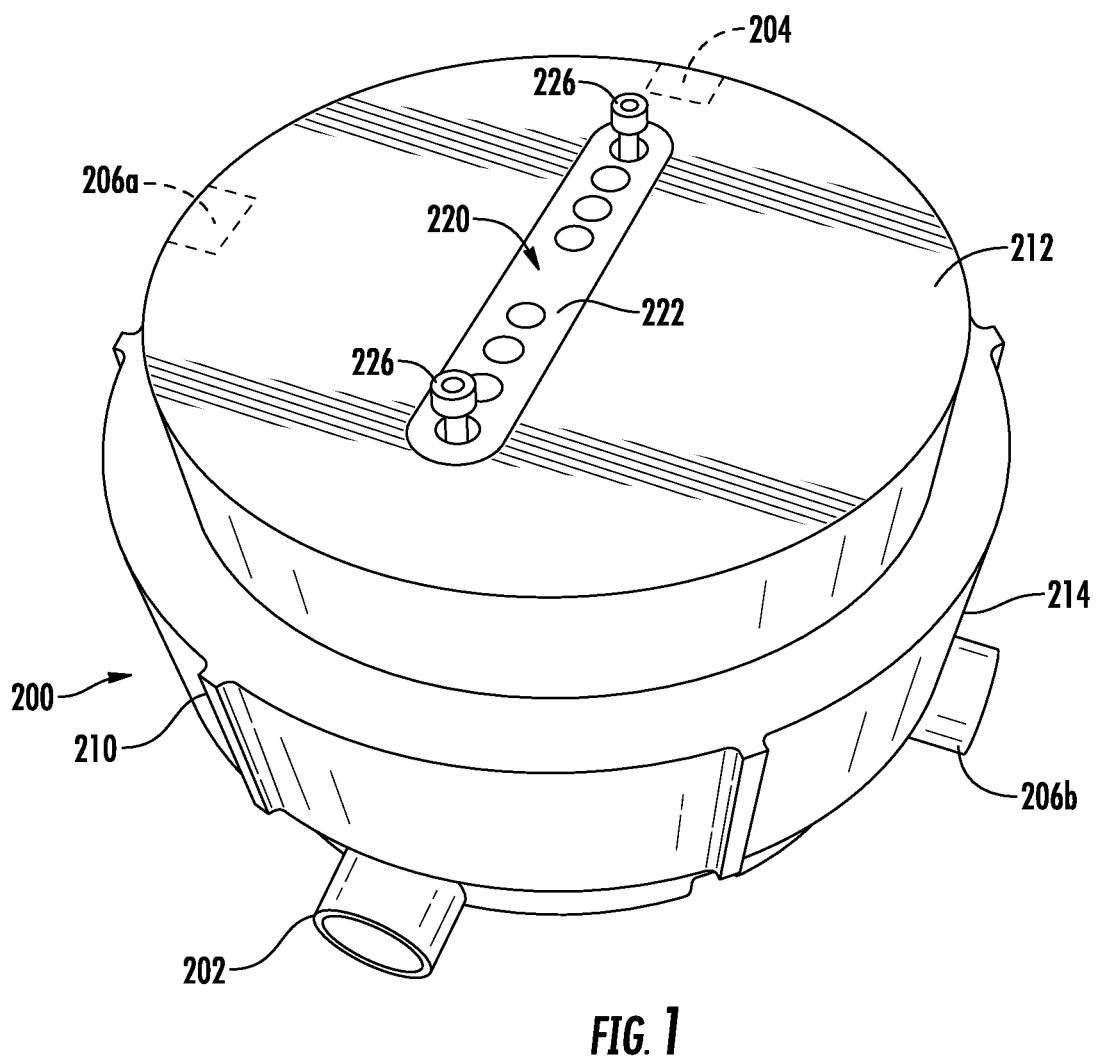
FIG. 1 illustrates a perspective view of an example of an embodiment of a self-contained filtration assembly formed in accordance with aspects of the present disclosure.
Figure 2:
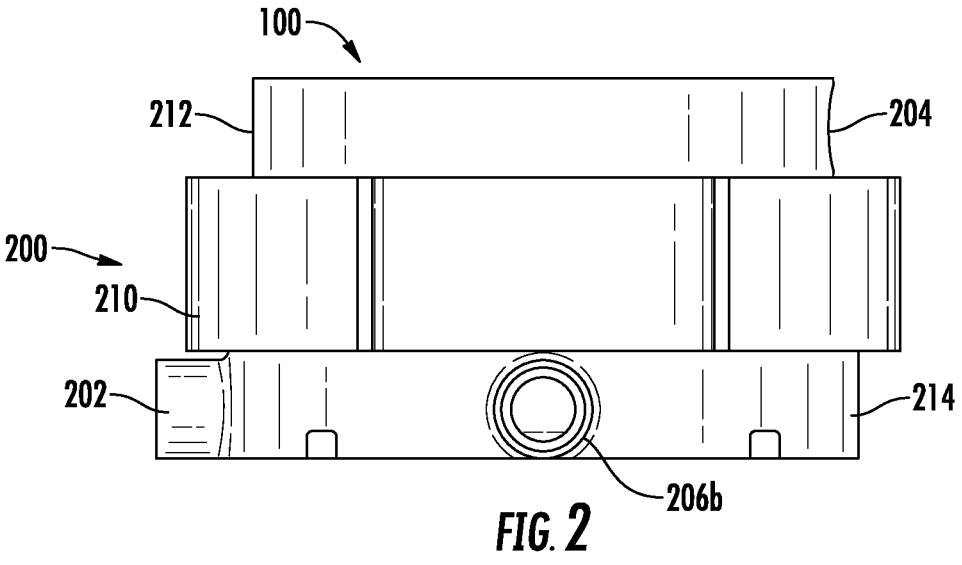
FIG. 2 illustrates a side view of a self-contained filtration assembly as illustrated in FIG. 1.
Figure 3:
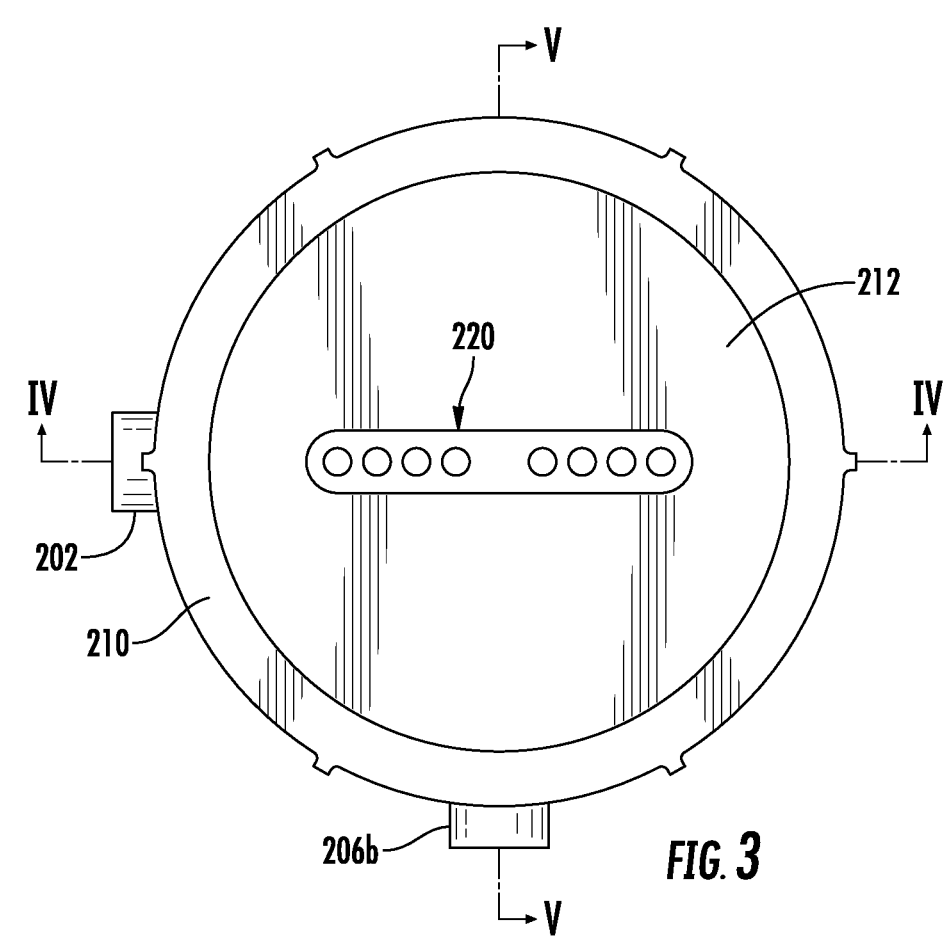
FIG. 3 illustrates a top view of a self-contained filtration assembly as illustrated in FIG. 1.

The following detailed description should be read with reference to the drawings, which depict illustrative embodiments. It is to be understood that the disclosure is not limited to the particular embodiments described, as such may vary. All apparatuses and systems and methods discussed herein are examples of apparatuses and/or systems and/or methods implemented in accordance with one or more principles of this disclosure. Each example of an embodiment is provided by way of explanation and is not the only way to implement these principles but are merely examples. Thus, references to elements or structures or features in the drawings must be appreciated as references to examples of embodiments of the disclosure, and should not be understood as limiting the disclosure to the specific elements, structures, or features illustrated. Other examples of manners of implementing the disclosed principles will occur to a person of ordinary skill in the art upon reading this disclosure. In fact, it will be apparent to those skilled in the art that various modifications and variations can be made in the present disclosure without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the appended claims and their equivalents.

It will be appreciated that the present disclosure is set forth in various levels of detail in this application. In certain instances, details that are not necessary for one of ordinary skill in the art to understand the disclosure, or that render other details difficult to perceive may have been omitted. The terminology used herein is for the purpose of describing particular embodiments only, and is not intended to be limiting beyond the scope of the appended claims. Unless defined otherwise, technical terms used herein are to be understood as commonly understood by one of ordinary skill in the art to which the disclosure belongs. All of the devices and/or methods disclosed and claimed herein can be made and executed without undue experimentation in light of the present disclosure.

As used herein, "longitudinal" means extending along the longer or larger dimension of an element. "Central" means at least generally bisecting a center point and/or generally equidistant from a periphery or boundary, and a "central axis" means, with respect to an opening, a line that at least generally bisects a center point of the opening, extending longitudinally along the length of the opening when the opening comprises, for example, a channel, a cavity, or a bore. As used herein, a "channel" or "bore" is not limited to a circular cross-section. As used herein, a "free end" of an element is a terminal end at which such element does not extend beyond.

In tangential-flow filtration ("TFF") systems formed in accordance with various principles of the present disclosure, a self-contained filtration assembly includes a cassette housing (which may alternately be referenced herein as a shell or pressure shell) enclosing stacked layers of filtration membranes and spacers. It will be appreciated that some or all of the spacers optionally include a screen, and in some cases the screens form the spacers. Accordingly, reference herein to spacers is intended to be understood broadly to encompass reference to spacers with or without screens, as well as screens (which may on their own function as spacers). The layers of membranes and spacers are stacked to form the filtration cassette portion of the filtration assembly. In some embodiments, as discussed in further detail below, the cassette is sealed within the housing to form a self-contained filtration assembly, with one or more inlet ports of the cassette in fluid communication with inlet ports of the housing, and one or more outlet ports of the cassette in fluid communication with outlet ports of the housing. Fluid to be filtered by the cassette (referenced herein as feed or feedstream) is fed into the inlet port of the housing and into the inlet port of the cassette. The retentate portion of the feedstream (not filtered out by the filtration system) exits the cassette and housing through one or more respective retentate outlet ports, and the permeate/filtrate portion of the feedstream (which is filtered out of the feedstream by the cassette) exits the cassette and housing through one or more respective permeate outlet ports.

More particularly, fluid to be filtered is passed through the inlet of the cassette (e.g., through a feed inlet port in the housing of the cassette), into the cassette along a feed inlet path (e.g., extending through feed-port-defining zones defined in the various layers forming the cassette), and tangentially into and along one or more feed channels within the cassette. The feed channels may be defined by a generally planar screen or spacer (with or without a screen therein). As used herein, description of an element as being "generally planar" may be understood (unless otherwise indicated) as the element being generally flat with a length (along the flow path of the feedstream along or through such element) and a width (transverse to the flow path of the feedstream) significantly greater than a thickness thereof to make the thickness generally negligible from a dimensional perspective, despite the potentially significant impact the thickness may have on the flow properties of a fluid flowing through such element (e.g., the velocity of a fluid being pumped therethrough). A screen, as used herein, may impart a degree of turbulence to the feedstream which may help to maintain fluid flow, such as to facilitate passage of the fluid through a channel, and may minimize settling of particles (e.g., on the membranes and potential concurrent or resultant fouling of the membranes). The fluid flows along a flow path from a first end of the cassette to a second end of the cassette, tangentially along the first (or upstream) surface of the generally planar membranes within the cassette. A portion of the fluid, with particles too large to pass through the membranes, passes tangentially along the first surface of the membranes (sweeps across the membranes), through the feed channel in the cassette and across the feed channel path length, out of the feed channel through a retentate port defined in the spacer, along a retentate outlet path along the cassette (e.g., through generally aligned retentate-port-defining zones through the various layers forming the cassette), and out another outlet port (the retentate outlet port) of the housing as retentate, without passing through the membranes. A portion of the fluid with particles smaller than the pore size of the membranes passes through (transverse and, generally, perpendicular/normal to) each of the membranes, from the first surface of the membrane to the second (or downstream) surface of the membrane, as permeate. It will be appreciated that the term permeate may be used interchangeably herein with the term filtrate without intent to limit. The membrane through which the permeate portion of the feedstream passes defines a permeate channel (generally parallel to the membrane and the feed channel) with another membrane (through which only the desired permeate may pass into the permeate channel) or with a gasket or other layer which seals the permeate channel, such as from the feed channel (but not from a permeate port, such as defined in/along the gasket, through which the permeate is retrieved from the permeate channel). A generally planar screen or spacer (with or without a screen therein) may be provided between the membranes to define the permeate channel therebetween. The permeate passes from the permeate channels through a permeate-port-defining zone defined in the permeate channel, along a permeate outlet path along the cassette, and out of the cassette through a permeate outlet port of the housing. It will be appreciated that reference herein to a spacer is to be understood as including only a spacer or only a screen or both a spacer and a screen without intent to limit. All options are within the scope and spirit of the present disclosure, the present disclosure not being limited by description of only one such option unless specifically indicated to be so limited. Moreover, the various ports through the layers of the cassette may be referenced herein with respect to or (instead) as port-defining zones or openings through or along each of the layers, such zones together defining flow paths through the cassette formed with such layers.

In accordance with various principles of the present disclosure, the feed stream flows into the cassette and the retentate flows out of the cassette through flow paths defined by ports defined through the various layers of membranes and spacers of the cassette at locations spaced from and within the perimeter of the layers (e.g., at first and second ends of the cassette in a direction of the flow path of the feed stream between the feed inlet ports and retentate outlet ports), whereas the permeate passes out of ports defined along open sides of the permeate channels and flows into a permeate outlet path defined between the perimeter or exterior of the cassette and the interior of the housing in which the cassette is contained. Phrased another way, in some embodiments, the feed stream and retentate ports may be considered to be bounded or enclosed ports (e.g., surrounded by a port wall), whereas the permeate ports may be considered to be open-sided ports (e.g., defined along an edge of a structure, such that such structure does not form a port wall fully surrounding the port). The flow of permeate through such permeate channels is initially transverse to the major plane of the permeate channels (defined by the length and width of the membranes) as the permeate passes through the membrane wall, and then may be generally tangential across the permeate channels, generally transverse or perpendicular to the flow path of the feedstream through the feed channels, as the permeate exits from the permeate channels through the permeate port and along the permeate outlet path extending through the cassette housing (between the outer perimeter of the various layers of the cassette and the interior of the cassette housing wall extending along the cassette). Such configuration facilitates formation of the cassette. For instance, permeate ports need not be created in the various layers of the cassette, and need not be aligned during stacking of the layers. Moreover, the permeate ports may be spaced apart from the retentate ports further than in prior TFF cassettes, facilitating formation of seals around and/or along such ports to fluidly isolate the retentate stream (e.g., within the feed channel and the retentate ports) from the permeate stream (e.g., within the permeate channel and the permeate ports). In contrast with prior TFF cassettes (which typically have one or more permeate ports defined through the stacked layers of the cassette, such that the permeate from each permeate channel within the cassette combines with permeate from other channels within the cassette to travel through permeate outlet paths defined within or bounded within the cassette, and then exits ports in the cassette to travel into a manifold, and then exits via a permeate outlet port), the permeate flowing out of the permeate channels of a cassette formed in accordance with various principles of the present disclosure flows out of the stacked layers of the cassette (e.g., out the edge of a permeate channel) and into the space between the cassette and the cassette housing to exit the cassette housing, such as via a permeate outlet port in the cassette housing.

In some embodiments, the retentate ports are simplified relative to ports of prior TFF cassettes. For instance, instead of multiple smaller ports (such as may be formed in prior TFF cassettes to provide space for permeate ports alongside the retentate ports), a generally elongated retentate port (e.g., a single elongated retentate port) may be formed at the downstream end of the feed channel. In some embodiments, the retentate port is generally positioned axially along the flow of the feed stream through the feed channel, at an end of the feed channel opposite the end at which the feed port is located (i.e., the feed port and the retentate port may be axially opposed to each other along the feed channel). For instance, if the feed channels are generally circular (e.g., a circle or a portion of a circle) and/or the TFF cassette housing is generally circular, then the feed port and the retentate port may be diametrically opposed from each other across the feed channels. Similarly, if the feed channels and/or the TFF cassette housing is generally elliptical, the feed port and the retentate port may be on opposite ends of the major axis of the elliptical shape of the feed channel. Alternatively, or additionally, if the feed channels are generally rounded, the feed ports and/or the retentate ports may be elongated as well as curved or arcuate to follow the rounded shape of the feed channel ends.

In some embodiments, the feed ports and inlet paths, and the retentate ports and outlet paths are positioned at opposite ends of the flow path of the feedstream (e.g., diametrically opposed within a TFF cassette with a generally circular cross-section, or at opposite ends of an axis, such as a major axis, of a TFF cassette with a generally elliptical cross-section, or otherwise at generally axially-opposed sides of the TFF cassette). In such embodiments, the permeate ports and outlet paths may be formed alongside the feedstream flow path, between the ends of the feedstream flow path at which the feed and retentate ports and flow paths are located. Such configuration may simplify formation of the various ports and flow paths of the TFF cassette by spatially separating such ports and flow paths. Moreover, such configuration may simplify fluidly isolating such ports and flow paths from one another as necessary to maintain the desired composition/content of the permeate. In some embodiments, the permeate spacer/screen may be shaped to generally follow the interior contour of the cassette housing (e.g., curved) with one or both sides (between the ends of the flow path of the feedstream through the feed channels of the cassette) configured to be spaced apart from the interior of the housing (e.g., straight or otherwise not following the interior contour of the cassette housing) to form permeate ports defining permeate outlet paths within the cassette between the exterior periphery of the cassette and the interior of the cassette housing.

In accordance with various principles of the present disclosure, an improved manner of forming the stacked layers of a TFF cassette is disclosed. In some embodiments, a "permeate channel packet" is formed by stacking a pair of membranes (or a membrane and a gasket) spaced apart to define a permeate channel therebetween. A permeate spacer, with or without a permeate screen, may be provided between the membranes (or membrane and gasket) of the permeate channel packet to define the permeate channel between the membranes (or membrane and gasket). One or more permeate channel packets are stacked in a TFF cassette housing to form at least one permeate channel (formed by the packet) layered with at least one feed channel. If two or more packets are stacked, at least one membrane is used between such packets. A feed spacer with or without a feed screen may define the feed channel between permeate channel packets (or between a permeate channel packet and a gasket). In some embodiments, multiple layers of feed channels (from which retentate exits the cassette) and permeate channels (from which permeate exits the cassette) are formed. A gasket may be provided as the top-most and/or bottom-most layer to seal the top-most or bottom-most channel from fluid of the adjacent channel and fluid in the retentate channels and outlet paths and the permeate outlet paths. For instance, the top-most channel may be a feed channel defined between a gasket layer and a membrane layer (e.g., of a permeate channel packet) with a spacer (optionally with a screen) therebetween, or, instead, a permeate channel defined between a gasket layer and a membrane layer with a spacer (optionally with a screen) therebetween. Similarly, the bottom-most channel may be a feed channel defined between a membrane layer (e.g., of a permeate channel packet) and a gasket layer with a spacer (optionally with a screen) therebetween, or, instead, a permeate channel defined between a gasket layer and a membrane layer with a spacer (optionally with a screen) therebetween. Various combinations of membranes, channel spacers, and gaskets are within the scope and spirit of the present disclosure, depending on the number of feed channels and permeate channels to be defined within the TFF cassette.

The stack of layers of membranes (and optional gaskets) alternating with spacers or screens may be bound together, such as by being impregnated and/or encapsulated (e.g., along the edges thereof) with a sealing material (e.g., urethane, polyurethane (e.g., liquid polyurethane), epoxy, silicone, polyethylene, polystyrene, nylon, rubber, a fluoropolymer such as polytetrafluoroethylene (PTFE), a thermoplastic material, a thermoset material, etc.) to form a sealed cassette which may then be positioned in the cassette housing. Such configuration of a cassette may be placed within a housing to form a self-contained filtration assembly. Such configuration facilitates integration of the self-contained filtration assembly into a fluid process system without further steps, such as clamping of the cassette layers, and/or connection with a manifold, and/or simplifies use of the filtration assembly, such as by being configured for connection with a fluid line using a standard sanitary connector (e.g., tri-clamp, hose barb, etc., such as known to those of ordinary skill in the art) to supply a feedstream into the cassette housing (e.g., through a feed inlet port in fluid communication with the feed inlet path defined in the cassette) and to withdraw retentate and permeate therefrom (e.g., through outlet ports in fluid communication with the retentate and permeate outlet paths defined in the cassette). In some embodiments, the various layers of the cassette have generally the same shape to facilitate formation of the cassette, such as encapsulation thereof, or other aspects of a cassette formed in accordance with various principles of the present disclosure, as may become further apparent with reference to further aspects of the present disclosure.

As may be appreciated, the feed and retentate should be kept separate from the permeate within the cassette. For instance, all ports, flow paths, channels, etc., for feed and retentate should be fluidly isolated from all ports, flow paths, channels, etc., for permeate to maintain the desired composition of the permeate. In some embodiments, each layer of the cassette (i.e., membranes, gaskets, spacers, screens, etc.) has feed-port-defining zones, retentate-port-defining zones, and permeate-port-defining zones each aligned with respective zones in other layers to form, respectively, feed inlet paths, retentate outlet paths, and permeate outlet paths along the cassette. In some embodiments, each of the flow paths is fluidly isolated from the other flow paths by a sealant around the ports defining the flow paths.

In accordance with various principles of the present disclosure, sealing of the various ports, flow paths, and channels of a cassette to fluidly isolate feed, retentate, and permeate within the cassette is performed in a manner which simplifies formation of seals as well as the cassette. In some embodiments, the sealing encapsulates the layers of the cassette to result in a self-contained filtration unit. In some embodiments, the sealing is performed in a reduced number of steps compared to steps required to form prior TFF cassettes. In some embodiments, the sealant not only fluidly isolates the ports, flow paths, and channels, but also bonds layers of the cassette together.

As noted above, each layer of the cassette (membrane, spacer, screen, gasket, etc.) has port-defining zones defining the flow path channels for the feed, retentate, and permeate flow paths along the cassette to allow feed stream and retentate and permeate to flow (e.g., transversely, such as perpendicularly) through or along the cassette. In accordance with various principles of the present disclosure, the feed-port-defining zones and the retentate-port-defining zones of the permeate channel packets are sealed from fluid communication with the permeate channel to fluidly isolate the permeate channel from the feed stream and the retentate (e.g., within the feed channel, the feed inlet path, the retentate outlet path, etc.). For instance, a sealing material such as polyurethane (e.g., liquid polyurethane), urethane, epoxy, silicone, polyethylene, polystyrene, polypropylene, nylon, rubber, a fluoropolymer such as polytetrafluoroethylene (PTFE), etc., is applied around the periphery of the feed-port-defining zones and the retentate-port-defining zones of the layers of the permeate channel packet. In some embodiments, the sealing material bonds the permeate spacer/screen and the membranes (or membrane and gasket) together to form the permeate channel packet. A further sealing layer (made of the same of different material as the above-described seal) may be applied along the permeate-port-defining zones once the permeate channel packet is formed, or at the same time sealing material is applied around the periphery of the feed-port-defining zones and the retentate-port-defining zones of the layers of the permeate channel packet. In some embodiments, as described above, the permeate-port-defining zones are along edges of the layers of the permeate channel packet between the feed-port-defining zones and the retentate-port-defining zones. Such sealing along the permeate-port-defining zones may be beneficial in forming the final cassette as described in further detail below.

As may be appreciated, the permeate-port-defining zones of the feed channels should also be sealed to prevent the feed channel from being in fluid communication with the permeate channel and the permeate outlet path. In accordance with various principles of the present disclosure, such sealing may be performed by applying a sealing material (e.g., such as used to form the seals around the feed-port-defining zones and the retentate-port-defining zones of the permeate channel packet) about the entire periphery of the feed spacer and/or the feed channel. More particularly, in some embodiments, permeate channel packets are stacked with spacers or screens forming the feed channel to form the stacked layers of the cassette. The sealing material may be applied about the perimeter of the stacked layers of the cassette to seal the one or more feed channels from the one or more permeate channels and one or more permeate outlet paths. Application of sealing material about the periphery of the cassette may have the further effect of binding the layers of the stack together to form an encapsulated cassette. In some embodiments, the layers of the cassette are placed within a bag or container which is then filled with flowable sealing material (e.g., liquid silicone), and vacuum pressure is applied to the layers of the cassette, such as through the feed inlet path and retentate outlet path, to cause the sealing material to seep inwardly around the periphery of the stacked layers to form a seal about the periphery of the layers. The vacuum pressure is controlled to achieve the desired thickness of a peripheral seal without interfering with the functioning of the membranes (e.g., not extending across the surface of the membrane to an extent which impacts filtration of permeate therethrough), such as may be readily determined by of ordinary skill in the art. Because the feed-port-defining zones and retentate-port-defining zone in the permeate spacers and/or permeate channel packets may have been previously sealed, such vacuum pressure does not cause the sealing material to be drawn inwardly along the permeate spacers and/or permeate channel packets.

As may be appreciated, in an embodiment in which the permeate ports are formed along the sides of the stacked layers of the TFF cassette (e.g., between the exterior/perimeter of the cassette and the interior of the cassette housing), it is important not to seal the sides of the permeate channels. If a seal is formed around the perimeter of the stack to bind the layers together, then the seal must be open along the permeate channels in the vicinity of the permeate-port-defining zones (e.g., along the sides of the permeate channels). In accordance with various principles of the present disclosure, the depth of penetration of sealing material along the permeate-port-defining zones may be controlled to vary between the feed channels and the permeate channels. For instance, as described above, the perimeter of the permeate channel packet may be provided, at least in the vicinity of the permeate-port-defining zones, with a thin layer of sealing material. For instance, the permeate channel packets may be dipped, brushed, sprayed, etc., with sealing material, and/or sealing material may be spreaded, molded, poured, etc., along at least the edges of the permeate channel packets. Such thin layer of sealing material prevents the sealing material used to seal the permeate-port-defining zones of the membranes and feed channels (and enveloping the layers of the cassette, such as to bond the layers together) from forming a further seal along the permeate-port-defining zones of the permeate channel (e.g., spacer/screen). For instance, such thin layer blocks sealing material from being drawn further along the permeate channel (as the sealing material is drawn along the feed channel to form a perimeter seal thereabout and to seal the permeate-port-defining zones of the feed channels). A thicker sealing layer may thus be formed around the feed channel, particularly along the permeate port so that feed containing retentate does not pass through the permeate port. Once sealing of the perimeter of the cassette has been completed, the thinner sealing layer along the permeate-port-defining zones of the permeate channels may be cut away to open the permeate-port-defining zones of the permeate channels to the permeate outlet path, while maintaining the integrity of the seal along the permeate-port-defining zones of the feed channels.

It will be appreciated that TFF cassettes often are subject to very high pressures. Although a TFF cassette with a circular cross-section, as in various embodiments of the present disclosure, eliminates various stress points common to polygonal (e.g., square or rectangular) TFF cassettes and provides better force distribution, as the cross-sectional area and/or height of the TFF cassette increases (e.g., to increase filtration capacity), pressures within the cassette increase. A typical TFF cassette may operate at internal pressures of about 60 psi. Moreover, to seal the cassette and filtration assembly, approximately 6000-8000 lb. of force must be applied to create a seal strong enough to hold the operating pressure of the cassette (which may add approximately another 3000 lb. of force to the cassette). Such pressure within the cassette may cause bending or warping or other distortions of the various layers of the cassette, which may lead to fluid escaping from the otherwise sealed ports, flow paths, channels, etc., and possibly allowing the retentate to mix with the permeate, bypassing the filtration function of the membranes. To prevent fluid leaks, seepage, escape, intermingling, etc., it generally is desirable to keep the surfaces of the various layers of the cassette as flat as possible, and within about 0.0001" (2.54 μm) of the flat plane of a completely flat layer.

In accordance with various principles of the present disclosure, in some embodiments a support clamp (e.g., a pin, bolt, beam, bar, etc.) is extended through support clamp openings defined in the layers forming the cassette to maintain the layers in position with respect to one another and to resist deformation (e.g., bending, bulging, warping, waving, etc.) of the layers. In accordance with various principles of the present disclosure, the support clamp is substantially centrally located, such as at the center of a generally circular cassette. In accordance with various principles of the present disclosure, the support clamp is generally elongated along the direction of flow path of the feedstream from the feed port to the retentate port. Such configuration reduces any dead legs or dead zones in the fluid flow, and/or other adverse effects the presence of an object, such as a support clamp, within the flow path may have. Moreover, such configuration distributes a retaining force over a greater area than a simple circular bolt or pin.

It will be appreciated that if the layers of a cassette held together with a support clamp as described above is also encapsulated with sealing material to form seals along the permeate-port-defining zones, it is generally desirable to also seal the openings through which such support clamp extends to seal/fluidly isolate the feed channels and permeate channels from fluid communication with one another. In accordance with various principles of the present disclosure, sealing material may be applied through the support clamp openings defined in the layers of the cassette, optionally at the same time as sealing material is applied about the periphery of the cassette. For instance, vacuum pressure may cause a flowable sealing material to extend through aligned support clamp openings defined in the layers of the cassette and to seep radially outwardly from such openings to seal the perimeters of such openings and thereby to seal the feed channels and the permeate channels from one another and fluidly isolate the feed stream and retentate from the permeate.

As may be appreciated, the present disclosure allows the fabrication of a self-contained TFF cassette that achieves the performance of a TFF cassette with greater ease of use. The present disclosure further allows the fabrication of a self-contained TFF cassette and assembly that eliminates traditional clamping. The cassette and assembly are closed/sealed, thereby minimizing exposure of the operator to materials therein (e.g., hazardous materials such as ADC (antibody drug conjugates), viruses, etc., or sensitive materials such as vaccines, monoclonal antibodies, etc.). In some aspects, a TFF cassette formed in accordance with various principles of the present disclosure is more economical for large scale systems, as expensive steel hardware is eliminated.

The present disclosure further improves upon prior TFF cassette designs by eliminating permeate flow through a flow distribution manifold and, instead, collecting the permeate flow in a shell that contains the cassette. This method of permeate collection reduces the complexity of a traditional cassette flow distribution manifold. An additional benefit of the alternate permeate flow path described in the present disclosure is the clamping operation needed to seal the cassette in place becomes simpler as fewer sealing surfaces are needed. This allows the device to be offered pre-assembled and eliminates the need for the end user to clamp the cassette between rigid plates, reducing complexity and the need for additional parts and assembly steps.

Various embodiments of tangential flow filtration cassettes, tangential flow filtration assemblies, and methods of making and using same will now be described with reference to examples illustrated in the accompanying drawings. Reference in this specification to "one embodiment," "an embodiment," "some embodiments", "other embodiments", etc. indicates that one or more particular features, structures, concepts, and/or characteristics in accordance with principles of the present disclosure may be included in connection with the embodiment. However, such references do not necessarily mean that all embodiments include the particular features, structures, concepts, and/or characteristics, or that an embodiment includes all features, structures, concepts, and/or characteristics. Some embodiments may include one or more such features, structures, concepts, and/or characteristics, in various combinations thereof. It should be understood that one or more of the features, structures, concepts, and/or characteristics described with reference to one embodiment can be combined with one or more of the features, structures, concepts, and/or characteristics of any of the other embodiments provided herein. That is, any of the features, structures, concepts, and/or characteristics described herein can be mixed and matched to create hybrid embodiments, and such hybrid embodiment are within the scope of the present disclosure. Moreover, references to "one embodiment," "an embodiment," "some embodiments", "other embodiments", etc. in various places in the specification are not necessarily all referring to the same embodiment, nor are separate or alternative embodiments necessarily mutually exclusive of other embodiments. It should further be understood that various features, structures, concepts, and/or characteristics of disclosed embodiments are independent of and separate from one another, and may be used or present individually or in various combinations with one another to create alternative embodiments which are considered part of the present disclosure. Therefore, the present disclosure is not limited to only the embodiments specifically described herein, as it would be too cumbersome to describe all of the numerous possible combinations and subcombinations of features, structures, concepts, and/or characteristics, and the examples of embodiments disclosed herein are not intended as limiting the broader aspects of the present disclosure. The following description is of illustrative examples of embodiments only, and is not intended as limiting the broader aspects of the present disclosure.

Turning now to the drawings, it will be appreciated that common features are identified by common reference elements and, for the sake of brevity and convenience, and without intent to limit, the descriptions of the common features are generally not repeated. For purposes of clarity, not all components having the same reference number are numbered. Moreover, a group of similar elements may be indicated by a number and letter, and reference may be made generally to one or such elements or such elements as a group by the number alone (without including the letters associated with each similar element). It will be appreciated that, in the following description, elements or components similar among the various illustrated embodiments are generally designated with the same reference numbers and redundant description is generally omitted for the sake of brevity. Moreover, certain features in one embodiment may be used across different embodiments and are not necessarily individually labeled when appearing in different embodiments.

Figure 4:
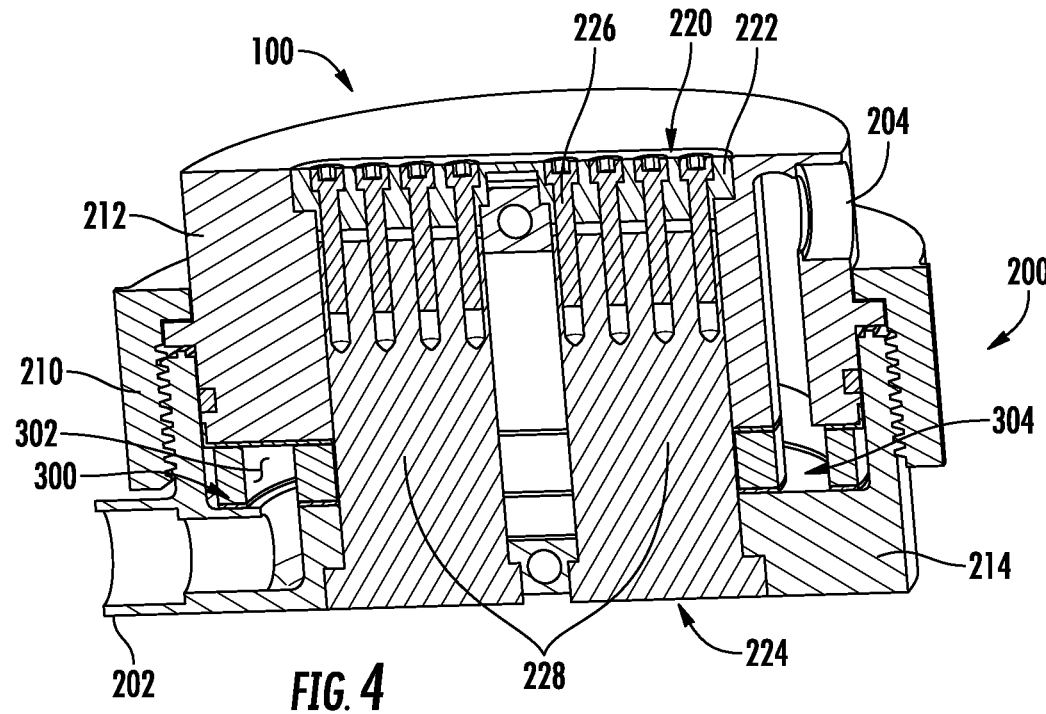
FIG. 4 illustrates a cross-sectional view along line IV-IV of FIG. 3.
Figure 5:
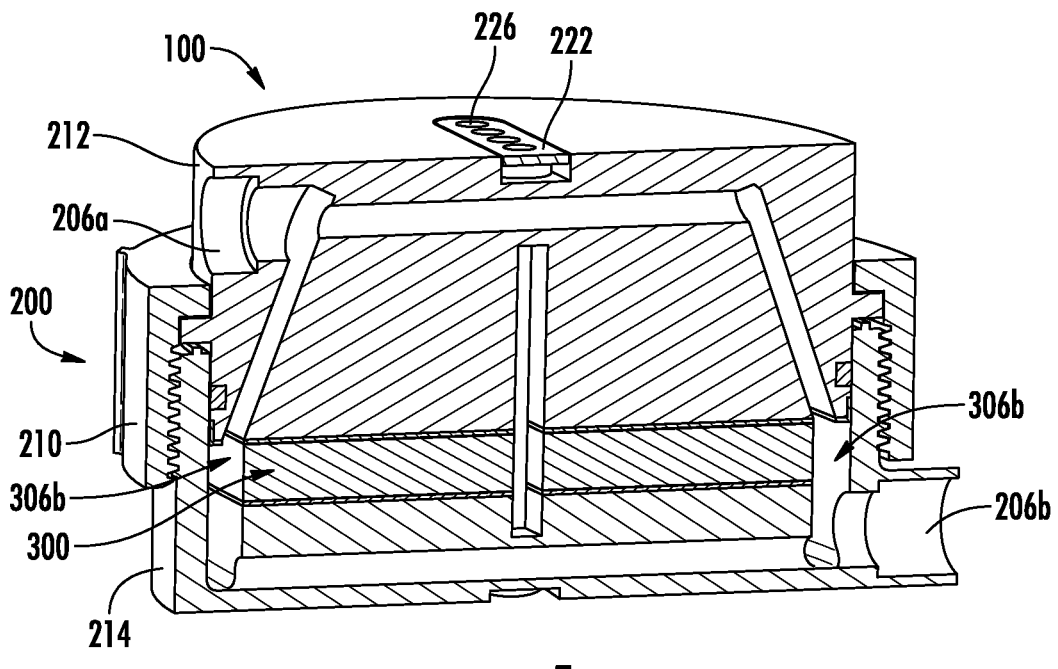
FIG. 5 illustrates a cross-sectional view along line V-V of FIG. 3.
Figure 6:
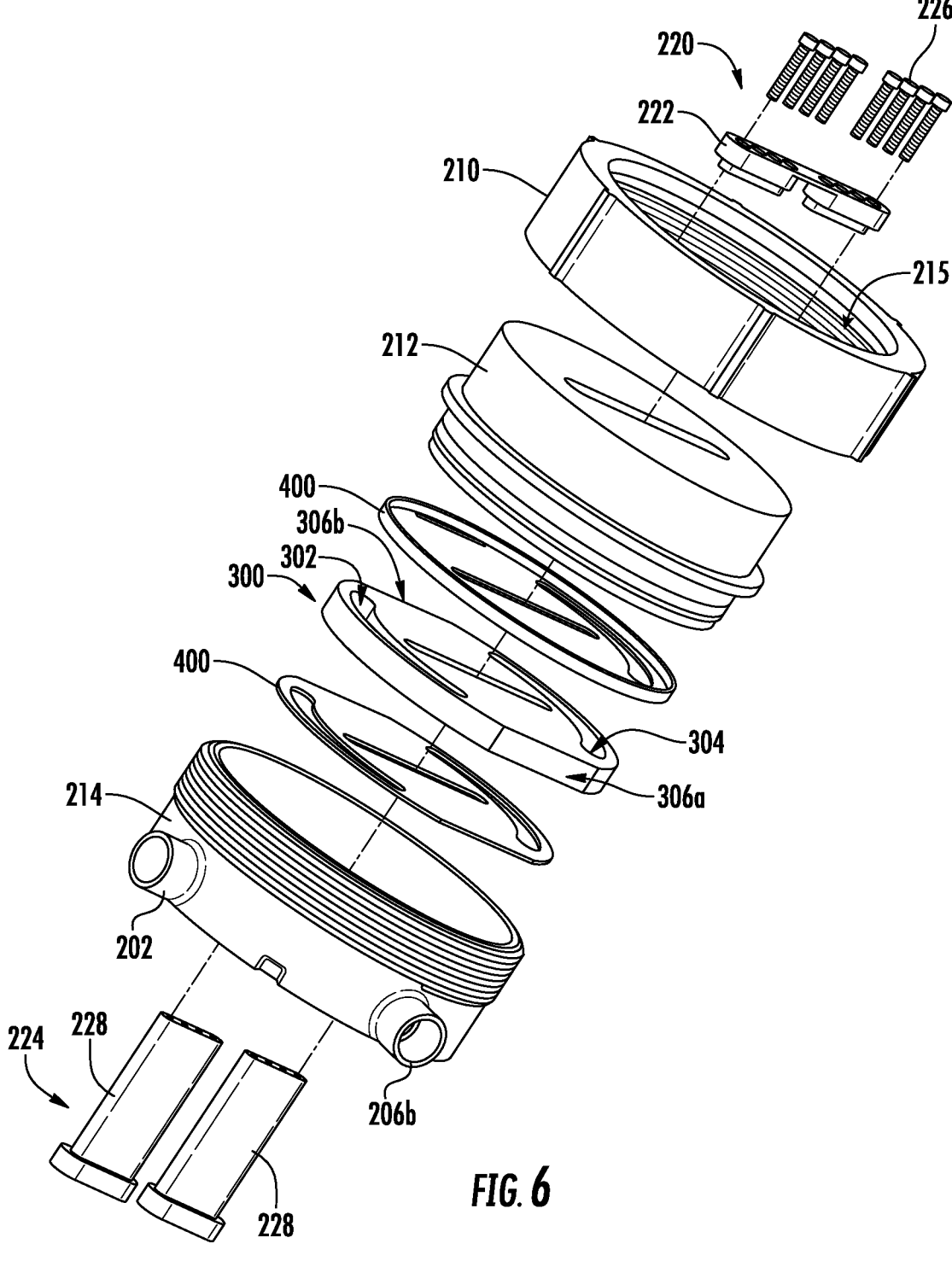
FIG. 6 illustrates an example of an embodiment of an exploded view of a self-contained filtration assembly as illustrated in FIG. 1.
Figures 7, 8, 9:
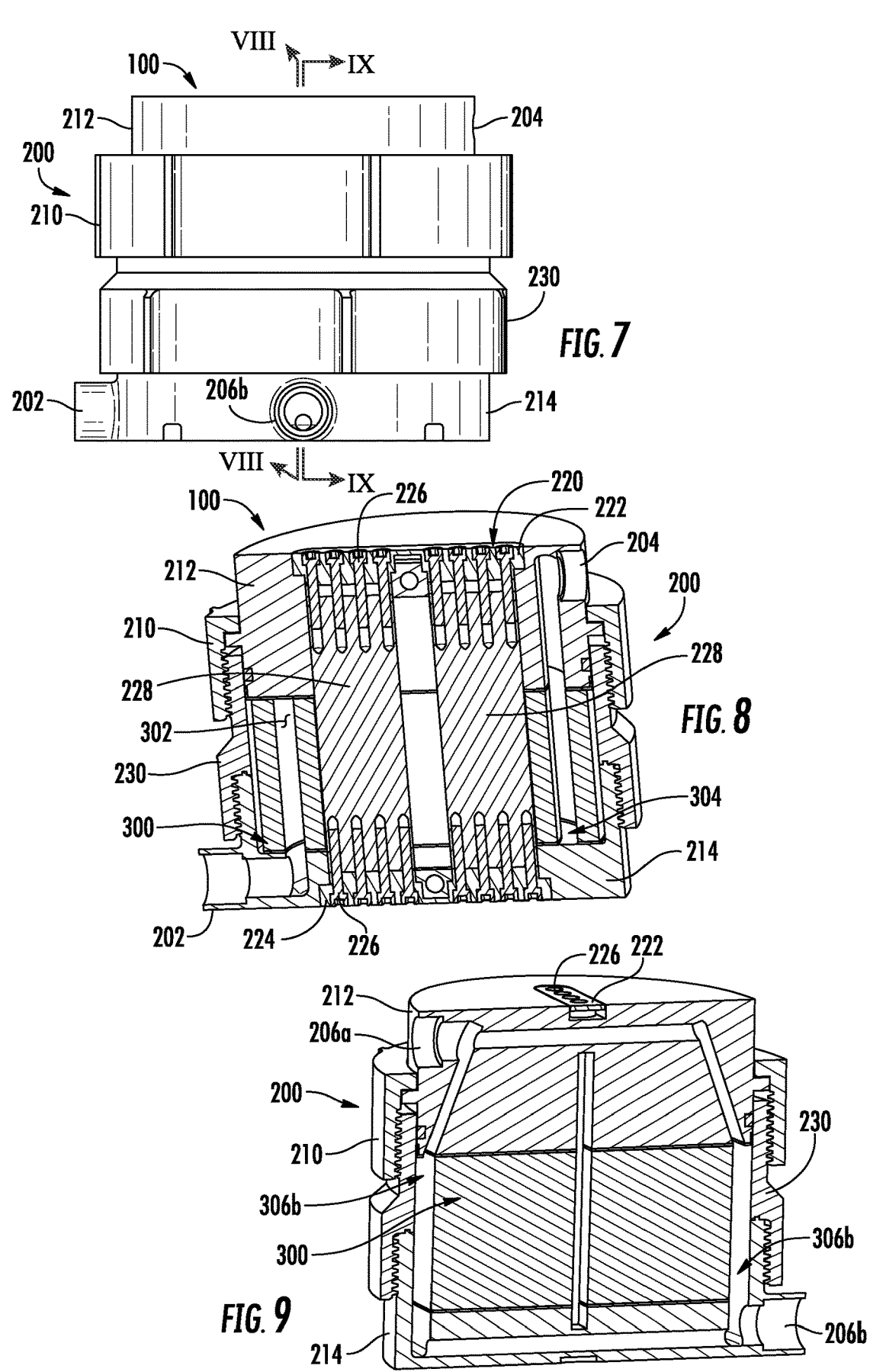
FIG. 7 illustrates a side view of an example of an embodiment of a self-contained filtration assembly formed in accordance with aspects of the present disclosure.
FIG. 8 illustrates a cross-sectional view along line VIII-VIII of FIG. 7.
FIG. 9 illustrates a cross-sectional view along line IX-IX of FIG. 7.
Figure 10:
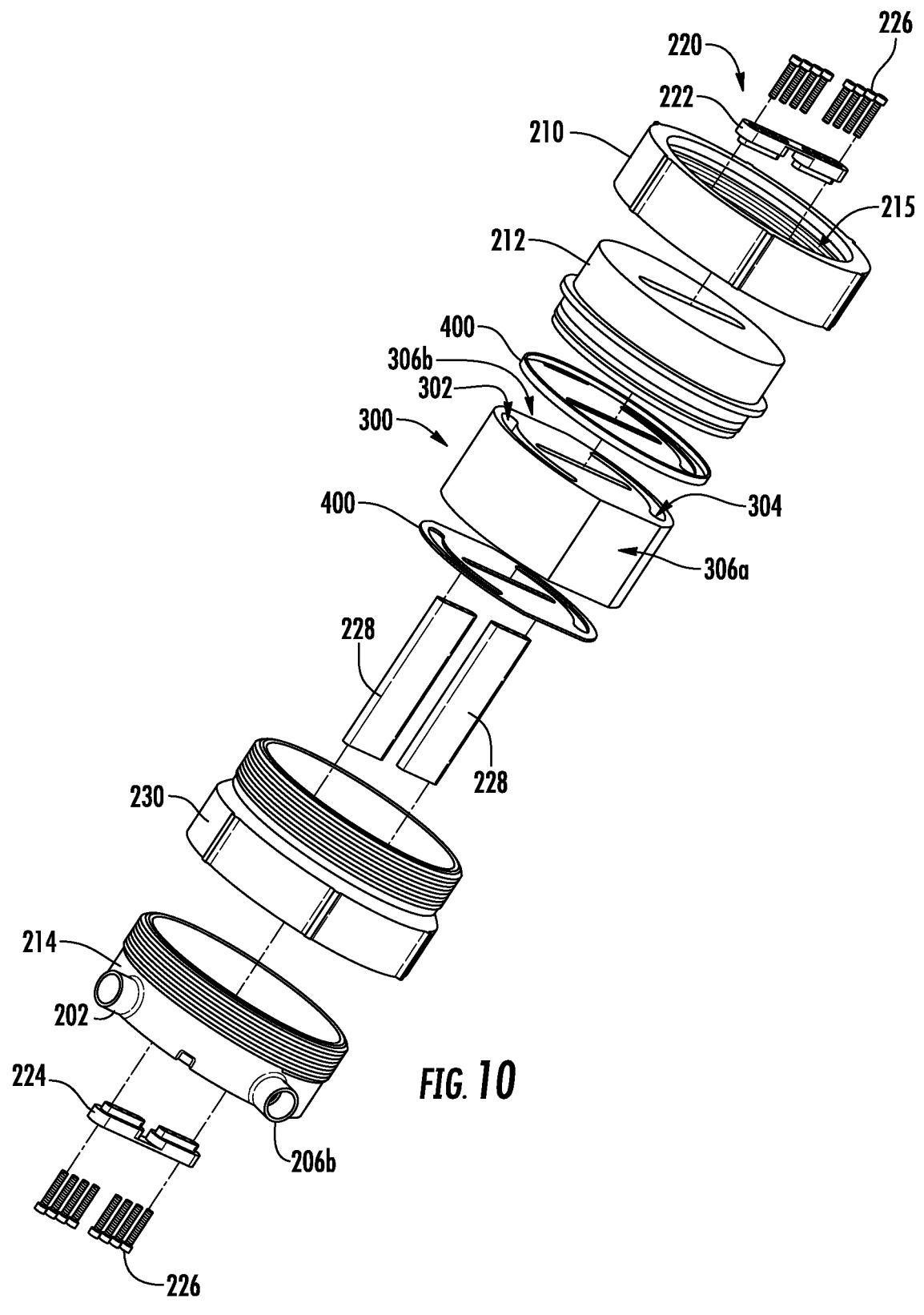
FIG. 10 illustrates an example of an embodiment of an exploded view of a self-contained filtration assembly as illustrated in FIG. 7.

An example of an embodiment of a filtration assembly 100 is illustrated in FIG. 1. The filtration assembly 100 has a housing 200 containing a cassette 300 therein (such as shown, for example, in FIG. 4 and FIG. 5). The cassette 300 is formed of one or more filtration membranes 310 layered with one or more feed spacers 320 (which define feed channels 325) and one or more permeate spacers 330 (which define permeate channels 335), such as shown, for example in FIG. 11, and discussed in further detail below. For the sake of convenience, and without intent to limit, reference is generally made to a plurality of membranes 310, feed spacers 320, and permeate spacers 330, though only one of each may be present in a cassette 300 formed in accordance with various principles of the present disclosure. An optional gasket 400 may be provided at the top and/or the bottom of the cassette 300, such as in the exploded view of an example of an embodiment illustrated in FIG. 6. Such gasket 400 may be sealed against an open top or bottom surface of the cassette 300 (e.g., against a membrane 310 or a feed spacer 320 or a permeate spacers 330) to retain the appropriate fluid therein (e.g., feedstream and/or retentate in a feed channel, and permeate/filtrate in a permeate channel) sealed/isolated from other fluids within the cassette 300, and to allow the proper fluid to flow into the associated outlet port and outlet flow path.

In some embodiments, the membranes 310 are ultrafiltration membranes and the filtration assembly 100 is an ultrafiltration assembly usable in biopharmaceutical processes, such as those requiring diafiltration/ultrafiltration of a feed material/fluid feed passed through the filtration assembly 100. The membrane 310 may be made of any of a variety of conventional filtering materials of the type normally associated with tangential flow filtration and depending upon the type of filtration desired. For example, the membrane material may be selected according to the components desired to be retained. The membrane 310 may be suitably selected for one or more of microfiltration, virus filtration, high-performance filtration, ultrafiltration, nanofiltration, reverse osmosis filtration, diafiltration, concentration, and the like, or any combination of thereof. The membrane 310 may be suitably selected to retain one or more of intact cells, cellular debris, viruses, proteins, antibiotics, sugars, salts, ions, macromolecules, monomers, oligomers, and the like, or any combination thereof. The membrane 310 may be suitably selected to allow one or more components to be passed into the permeate/filtrate such as colloidal material, viruses, proteins, salts, ions, small peptides, monomers, oligomers, water, solvent, and the like, or any combination thereof. The membrane 310 may be suitably selected to have any cutoff range between 9 $\mu$m and 0.01 kD. This range includes any value or subrange therebetween, including 9, 5, 1, 0.9, 0.5, 0.2, 0.1, 0.09, 0.05, 0.01 $\mu$m; 1000, 700, 500, 300, 200, 100, 50, 25, 10, 5, 1, 0.5, 0.1 kD; including all increments therebetween, and any combination thereof. Other suitable cutoff ranges for membrane 310 include 0.05-1 $\mu$m, 100 kD-0.05 $\mu$m, kD-300 kD, 1 kD-1000 kD, and <1 kD, including all values therebetween. The membrane 310 may be made from a material such as polyethersulfone, regenerated cellulose, nylon, Teflon, polypropylene, polycarbonate, polyvinylidene fluoride, polyester, cellulose acetate, or any other material that can selectively allow passage of components. Combinations of membranes 310 having differing filtering capacities may be suitably used within the cassette 300 as well.

As may be appreciated with reference to FIG. 1, FIG. 2, FIG. 4, FIG. 5, and FIG. 6, the illustrated example of an embodiment of a housing 200 has a shell formed from a lock ring 210 joining a housing top 212 and a housing bottom 214. The housing top 212 and the housing bottom 214 are generally parallel to each other and parallel to the flow path of the feedstream within the cassette 300. The sides of the lock ring 210 define an interior 215 of the housing 200 within which the cassette 300 is contained, surrounding the perimeter of the cassette 300 (perimeter of the stacked layers forming the cassette 300). The lock ring 210 of this example of an embodiment is coupled with the housing top 212 and the housing bottom 214 in a manner known to those of ordinary skill in the art to withstand the pressures within the filtration assembly 100, such as ranging from about 1 to 200 psi, including all values and subranges therebetween (e.g., including, without limitation, about 1, 5, 10, 15, 20, 30, 40, 50, 60, 70, 80, 90, 100, 110, 120, 140, 160, and 200 psi). Such couplings include, without limitation, threadings (e.g., as shown in the illustrated example of an embodiment), welds (e.g., thermal welds), brazings, bonds (radiofrequency, adhesive, etc.), compression fitting, exterior clamps, and the like, or any combination thereof. The housing 200 (e.g., any components thereof) may be made of any material capable of withstanding increased internal pressures and/or temperatures (e.g., increased temperatures during processing, such as temperatures ranging from about 5 to 120° C., including all values and subranges therebetween), and/or suitably chemically and/or biologically resistant, and/or suitable for pharmaceutical grade or other sterile processing (e.g., gamma irradiation, steaming, autoclaving, etc.), such material including, without limitation, stainless steel, glass, polymeric materials (e.g., polypropylene, nylon or other engineering plastics), or any combination thereof.

The housing 200 includes a feed port 202 which may be formed in any suitable component of the housing 200, such as the housing bottom 214 as shown in the example of an embodiment illustrated in FIG. 1, FIG. 2, FIG. 3, FIG. 4, and FIG. 6. The feed port 202 is in fluid communication with a feed inlet path 302 extending through the membrane and spacer layers of the cassette 300 to feed a feedstream F into feed channels 325 within the cassette 300 (see, e.g., FIG. 4, FIG. 6, and FIG. 11). The retentate R portion of the feedstream F which passes through the feed channels 325 of the cassette 300 flows through a retentate outlet path 304 extending through the membrane and spacer layers of the cassette 300 (see, e.g., FIG. 4, FIG. 6, and FIG. 11), and out a retentate outlet port 204 which may be formed in any component of the housing 200, such as the housing top 212 as shown in the example of an embodiment illustrated in FIG. 1, FIG. 2, and FIG. 4. The permeate P portion of the feedstream F which passes through the membranes 310 of the cassette 300 flows through the permeate channels 335 and out the permeate outlet paths 306a, 306b extending along the membrane and spacer layers of the cassette 300 (e.g., along opposite sides of the cassette 300, such as in the example of an embodiment illustrated in FIG. 5, FIG. 6, and FIG. 11), and out corresponding permeate outlet ports 206a, 206b (each associated with one of the permeate outlet paths 306a, 306b extending along the sides of the cassette 300) which may be formed in any component of the housing 200, such as the housing top 212 and/or the housing bottom 214 as shown in the example of an embodiment illustrated in FIG. 1, FIG. 2, FIG. 3, FIG. 5, and FIG. 6. So long as the ports 202, 204, 206a, 206b are in fluid communication with a respective feed inlet path 302, retentate outlet path 304, and permeate outlet path 306, the ports 202, 204, 206a, 206b can be disposed anywhere along the cassette housing 200. Examples of flow patterns of feedstream F, retentate R, and permeate P through the cassette 300 are illustrated in further detail in FIG. 11 and described in further detail below.

As may be appreciated with reference to FIG. 1, FIG. 3, FIG. 4, and FIG. 6, a support clamp assembly 220 extends through the housing 200 to maintain the sealed integrity of the housing 200 against the buildup of pressures therein. In the example of an embodiment illustrated in FIG. 1, FIG. 2, FIG. 3, FIG. 4, FIG. 5, and FIG. 6, the support clamp assembly 220 holds or clamps the lock ring 210, the housing top 212, and the housing bottom 214 together against pressures which build up within the filtration assembly 100. In the illustrated example of an embodiment (see, e.g., FIG. 4 and FIG. 6), the support clamp assembly 220 includes a top support clamp 222, a bottom support clamp 224, connectors 226 (such as, without limitation, bolts, screws, etc.), and one or more support clamp extensions 228 extending through the layers of the cassette between the top support clamp 222 and the bottom support clamp 224 (as illustrated), although other configurations are within the scope and spirit of the present disclosure. Such components of the support clamp assembly 220 are held together by any of a variety of known structures, such as, without limitation, threadings (e.g., as shown in the illustrated example of an embodiment), welds (e.g., thermal welds), brazings, bonds (radiofrequency, adhesive, etc.), compression fittings, and the like, or any combination thereof. In accordance with various principles of the present disclosure, the one or more support clamp extensions 228 of the support clamp assembly 220 are generally elongated in the direction of fluid flow of the feedstream F through the feed channels 325 from the feed inlet path 302 toward the retentate outlet path 304 (see, e.g., FIG. 1, FIG. 3, FIG. 4, and FIG. 6 with reference to FIG. 11). Such configuration has proven to reduce the potential of pillowing and/or warping to occur among any of the membrane or spacer layers of the cassette 300. Cassettes formed in accordance with various principles of the present disclosure may have a flatness of at least 0.010" (0.254 mm), as generally desirable in the industry to avoid bonding and sealing difficulties.

The size of a cassette (e.g., as determined by the size or number of layers of membranes therein) of a filtration assembly formed in accordance with various principles of the present disclosure may be suitably scaled up or down as needed, with an accompanying scale up or down of the housing and shell containing the cassette. For instance, one or more of the height or area or diameter of the components of the filtration assembly can be adjusted. In some embodiments, the height of the housing of a filtration assembly formed in accordance with various principles of the present disclosure can be suitably varied to accommodate as many alternating layers of membranes and optional spacers or screens as appropriate for the intended use of the filtration assembly. For instance, the height of a filtration assembly formed in accordance with various principles of the present disclosure can have a height of at least about 0.125" (3.175 mm) and up to about 28" (about 2 cm up to about 72 cm). In some embodiments, the membrane areas may be at least about 0.1 ft$^2$ to about 1000 ft$^2$ (about 0.01 m$^2$ to about 92.9-100 m$^2$), such as about 1.1 ft$^2$ (0.1 m$^2$) or more, including all values and subranges therebetween. The diameter (e.g., internal diameter) of a generally cylindrical shell of a housing containing a cassette formed in accordance with various principles of the present disclosure may be sized, shaped, configured, and/or dimensioned to accommodate cassettes having diameters ranging from about 1 inch to about 24 inches (about 2 cm to about 61 cm) including all values and subranges therebetween, and typically about 8" to about 9" (about 20 cm to about 23 cm).

An example of an embodiment of a taller filtration assembly 100' formed in accordance with various principles of the present disclosure is illustrated in FIG. 7, FIG. 8, FIG. 9, and FIG. 10. As may be appreciated, in contrast with FIG. 2, FIG. 4, FIG. 5, and FIG. 6, instead of the lock ring 210 engaging both the housing top 212 and the housing bottom 214, an adaptor 230 may be included to extend, with the lock ring 210, across the height of the cassette 300 between the housing top 212 and the housing bottom 214. For instance, in the example of an embodiment illustrated in FIG. 8, the lock ring 210 engages the housing top 212 and an upper portion of the adaptor 230, and the adaptor 230 extends the remainder of the height of the filtration assembly 100' to be coupled with an upper portion of the housing bottom 214 so that the lock ring 210 and adaptor 230 together hold the housing 200 together in a sealed configuration. As described above with reference to the coupling of the lock ring 210 of the example of an embodiment of a filtration assembly 100 illustrated in FIGS. 1-6, the coupling of the lock ring 210 and the coupling of the adaptor 230 of the example of an embodiment of a filtration assembly 100' illustrated in FIGS. 7-10 may be effected in a manner known to those of ordinary skill in the art to withstand the pressures within the filtration assembly 100', such as ranging from about 1 to 200 psi, including all values and subranges therebetween (e.g., including, without limitation, about 1, 5, 10, 15, 20, 30, 40, 50, 60, 70, 80, 90, 100, 110, 120, 140, 160, and 200 psi). Such couplings include, without limitation, threadings (e.g., as shown in the illustrated example of an embodiment), welds (e.g., thermal welds), brazings, bonds (radiofrequency, adhesive, etc.), compression fitting, exterior clamps, and the like, or any combination thereof. It will be appreciated that even larger adaptors, a lock ring coupled with the housing bottom (in addition to, or instead of, a locking ring coupled with the housing top), and other arrangements, configurations, sizes, and shapes of adaptors and lock rings, and housing tops and housing bottoms, which seal a cassette formed in accordance with various principles of the present disclosure are within the scope and spirit of the present disclosure.

Other features and structures of the example of an embodiment of a filtration assembly 100' illustrated in FIG. 7, FIG. 8, FIG. 9, and FIG. 10 may be substantially the same as corresponding features and structure of the example of an embodiment of a filtration assembly 100 illustrated in FIG. 1, FIG. 2, FIG. 4, FIG. 5, and FIG. 6. The common features and structures are thus indicated with the same reference numerals, and, simply for the sake of brevity, reference is made to the above descriptions of such elements in FIG. 1, FIG. 2, FIG. 4, FIG. 5, and FIG. 6 as applicable to the similarly-referenced elements in FIG. 7, FIG. 8, FIG. 9, and FIG. 10.

Figure 11:
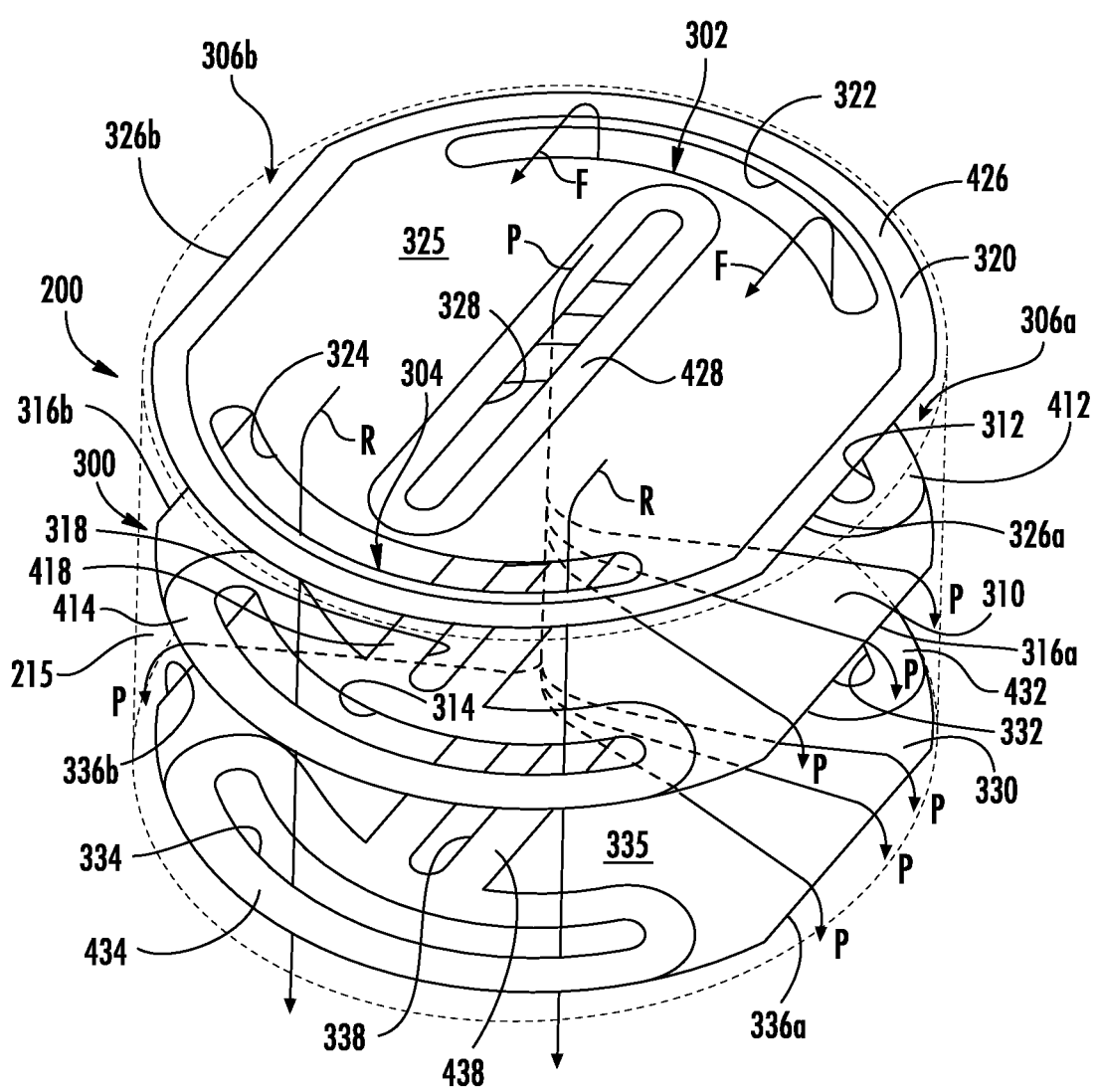
FIG. 11 illustrates an exploded view of layers of an example of an embodiment of a tangential flow filtration cassette formed in accordance with various principles of the present disclosure.

As described above, and as illustrated as a schematic example in FIG. 11, a cassette 300 of a filtration assembly 100, 100' formed in accordance with various principles of the present disclosure defines various flow paths for feed, retentate, and permeate therethrough. In accordance with various principles of the present disclosure, feed-port-defining zones 312, 322, and 332 are defined in each of the membranes 310, feed spacers 320, and permeate spacers 330, respectively, of a cassette 300 formed in accordance with various principles of the present disclosure to define a feed inlet path 302 through the cassette 300. Further in accordance with various principles of the present disclosure, retentate-port-defining zones 314, 324, and 334 are defined in each of the membranes 310, feed spacers 320, and permeate spacers 330, respectively, of a cassette 300 formed in accordance with various principles of the present disclosure to define a retentate outlet path 304 through the cassette 300. Finally, in accordance with various principles of the present disclosure, permeate-port-defining zones 316, 326, and 336 are defined in each of the membranes 310, feed spacers 320, and permeate spacers 330, respectively, of a cassette 300 formed in accordance with various principles of the present disclosure to define a permeate outlet path 306 through the cassette 300.

In order to maintain the desired contents of the filtrate separate from the retentate (e.g., to achieve the desired filtration for which a filtration assembly formed in accordance with various principles of the present disclosure is used), the various feed, retentate, and permeate flow paths are sealed from one another. In accordance with various principles of the present disclosure, the port-defining-zones in each of the membranes and spacers defining the various flow paths are sealed from one another in a manner which seals the various feed, retentate, and permeate flow paths from one another. For example, a permeate seal 426 may be formed about the perimeter of the feed spacers 320 to seal the feedstream F flowing through the feed spacers 320 (and thus retentate R) from flowing into the permeate outlet path 306 within the filtration assembly 100 (e.g., between the interior 215 of the housing 200/lock ring 210, and the exterior of the cassette 300), such as in the example of an embodiment of a feed spacer 320 illustrated in FIG. 12. Similarly, a feed seal 432 and a retentate seal 434 may be respectively formed about the feed-port-defining zone 332 and the retentate-port-defining zone 334 of the permeate spacer 330, such as in the example of an embodiment of a permeate spacers 330 illustrated in FIG. 13. If an elongated clamp assembly 220 extends through the cassette 300, then a clamp assembly seal 418, 428, and 438 may be formed about a clamp assembly opening 318, 328, 338 of each of the membranes 310, feed spacers 320, and permeate spacers 330, respectively, to seal feedstream F from entering the respective clamp assembly opening 318, 328, 338 and from entering the space between the outside of the cassette 300 and the interior of the housing 200.

Figure 12:
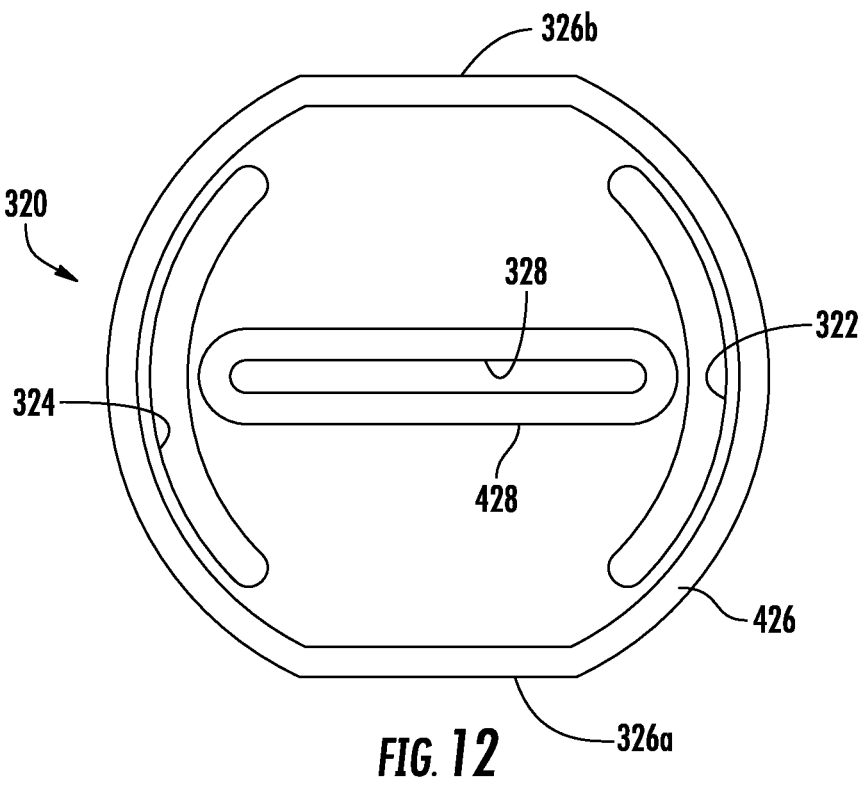
FIG. 12 is a plan view of feed spacer as in FIG. 11.
Figure 13:
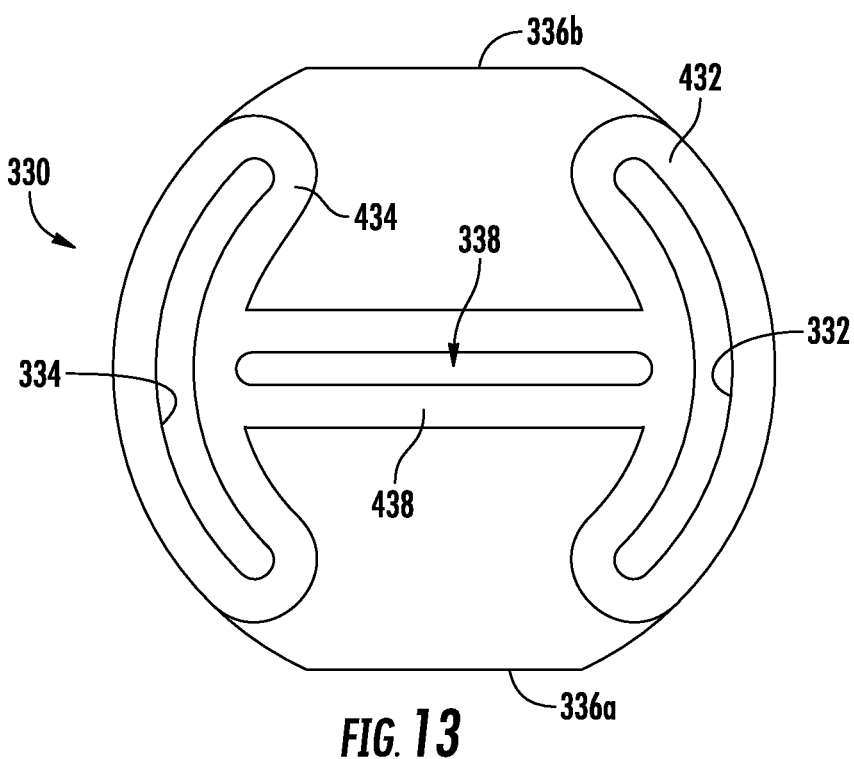
FIG. 13 is a plan view of a permeate spacer as in FIG. 13.

In some embodiments, the shapes of each of the membrane and spacer layers are substantially the same (such as illustrated in FIG. 11, FIG. 12, and FIG. 13), thereby facilitating formation of the various flow paths through the cassette 300 as well as assembly of the cassette 300. The locations, shapes, configurations, etc., of the port-defining zones in the membrane and spacers layers forming a cassette 300 in accordance with various principles of the present disclosure various flow paths within the cassette 300 may further facilitate assembly of the cassette 300. For instance, formation of permeate outlet paths within the housing 200 between the interior 215 of the housing 200 and the periphery of the cassette 300, rather than within the perimeter of the layers of the cassette 300 (along a side of the layers rather than as an opening within the perimeter of the layers surrounded by the material of the layers), may simplify formation of the permeate outlet paths as well as facilitate differentiation from the retentate outlet paths and alignment of the permeate outlet paths and retentate outlet paths. Accordingly, although the shape of the various layers of the cassette 300 may generally correspond with (follow, such as be generally the same shape as) the shape/contour of the interior 215 of the cassette housing 200, a space is defined between the layers of the cassette 300 and the interior 215 of the cassette housing to define permeate outlet paths 306*a*, 306*b* In the examples of embodiments of filtration assemblies 100, 100' illustrated in FIGS. 1-10, the cross-sectional shape of the housing 200, or at least the cross-sectional shape of the interior 125 of the lock ring 210 of the housing 200 is generally rounded. The shape of at least a portion of the membranes and spacers may generally follow the shape/contour of the interior 215 of the housing 200, such as may be appreciated with reference to FIG. 11. However, to form permeate outlet paths 306*a*, 306*b* between the cassette 300 and the interior 215 of the housing 200, the shape of the membranes and spacers 320, 330 in the vicinity of the permeate-port-defining zones of such layers defining the permeate outlet paths 306*a*, 306*b* may not correspond with the shape/contour of the interior 215 of the housing 200 to define a space therebetween. For instance, in examples of embodiments illustrated in FIG. 6, FIG. 10, FIG. 11, FIG. 12, and FIG. 13, the permeate-port-defining zones may be formed by cutting generally flat segments of the generally circular shapes of the membranes and spacers (either literally, by cutting circular membranes or spacers, or figuratively, by simply forming the membranes and spacers in a shape already having such sides) to form the permeate outlet paths along such cut regions. Such configuration simplifies formation of the various flow paths, facilitates alignment of various port-defining zones of the various layers of the cassette 300, and facilitates sealing of the stacked layers of the cassette 300 into a self-contained unit, among other benefits. It will be appreciated that other shapes and configurations may be used in accordance with various principles of the present disclosure to achieve the various structures, features, advantages, etc., described herein.

Figure 14:
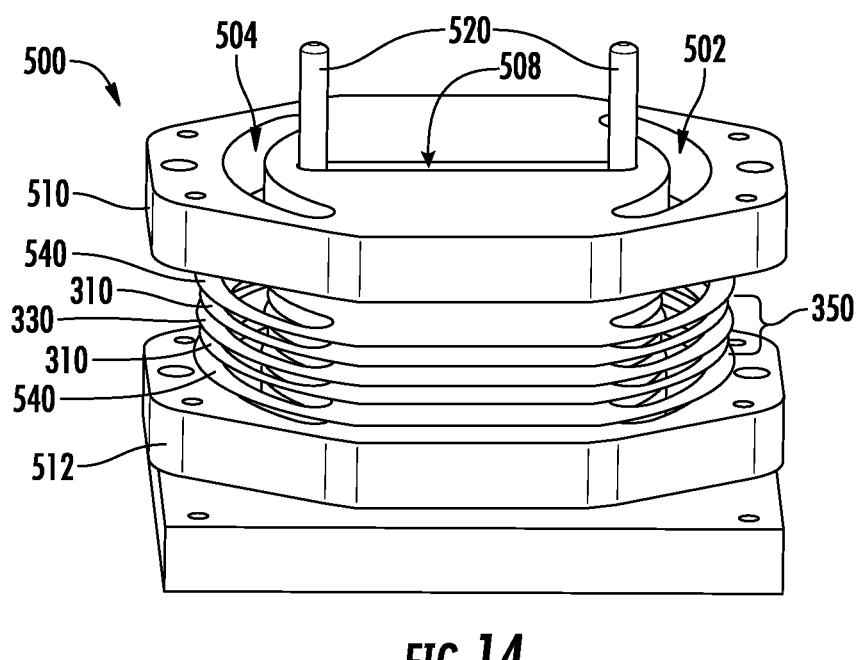
FIG. 14 is a perspective view illustrating a first stage stacking assembly of a tangential flow filtration cassette in accordance with various principles of the present disclosure.
Figure 15:
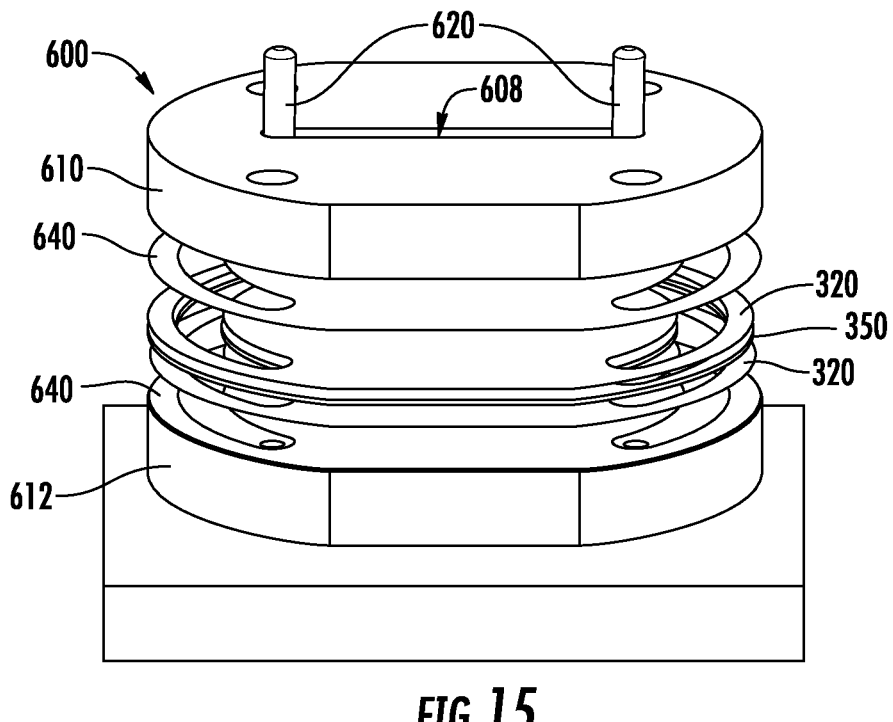
FIG. 15 is a perspective view illustrating a second stage stacking assembly of a tangential flow filtration cassette in accordance with various principles of the present disclosure.
Figure 16:
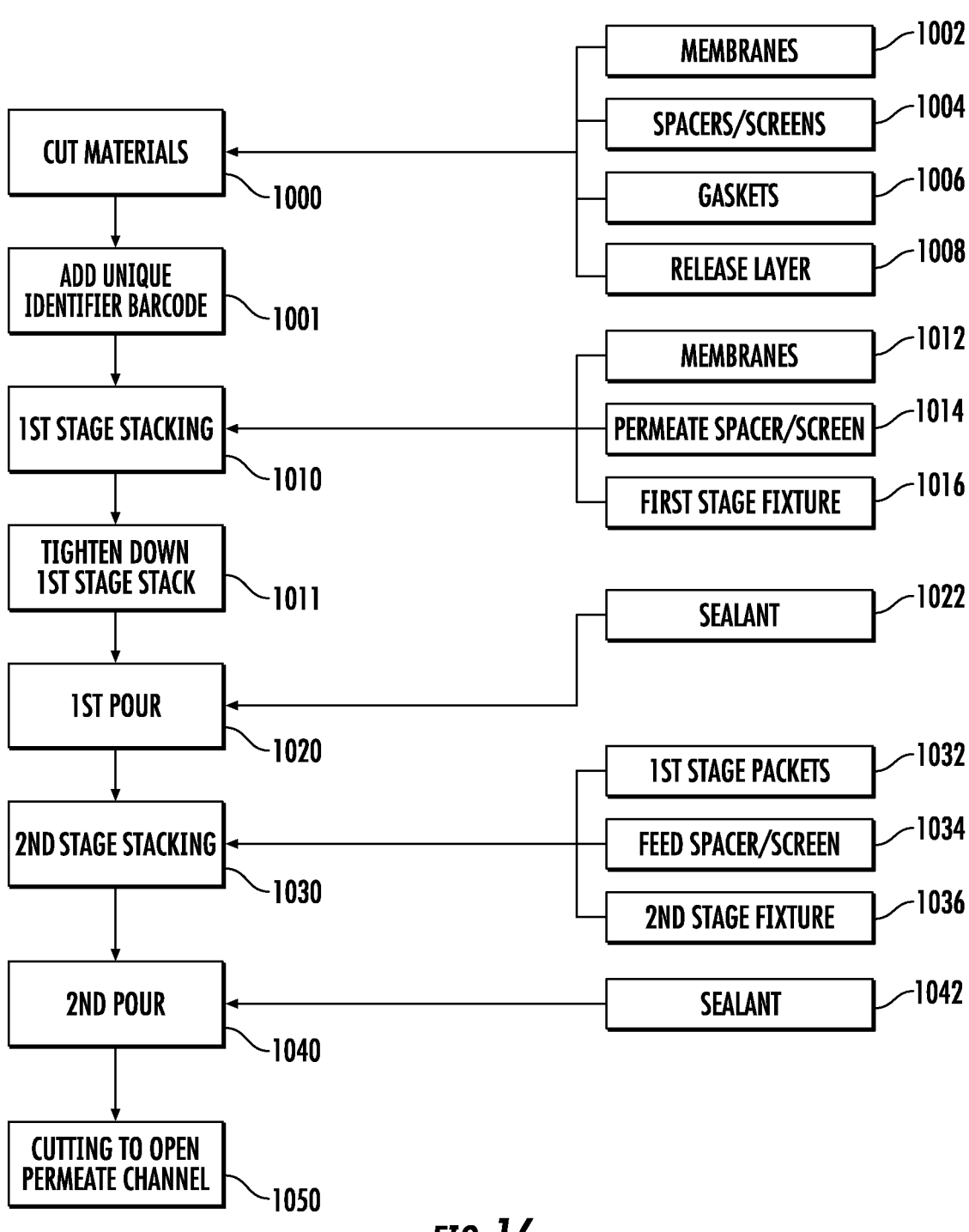
FIG. 16 is a flow chart of steps of a method of making a tangential flow filtration cassette in accordance with various principles of the present disclosure.

An example of a manner of forming a filtration assembly 100, 100' in accordance with various principles of the present disclosure is illustrated in FIG. 14 and FIG. 15 and schematically represented in the flow chart of FIG. 16. As may be appreciated in view of the above description, and with reference to FIG. 12, the feed-port-defining zone 322 of a feed spacer 320 remains unobstructed to allow feedstream F to flow therethrough and into the feed channel 325 defined by the feed spacer 320, such as illustrated in FIG. 11. Similarly, the retentate-port-defining zone 324 of a feed spacer 320 remains unobstructed to allow retentate R from the feedstream F flowing in the feed channel 325 to flow into the retentate-port-defining zone 324 to flow out of the cassette 300 through the retentate outlet path 304, such as illustrated in FIG. 11. However, in accordance with various principles of the present disclosure, a seal 426 is provided about the perimeter of the feed spacer to prevent the feedstream F and the retentate R from flowing into the permeate outlet path 306. In contrast, such seal is absent in the permeate spacer 330 to allow permeate which has flowed through the membrane 310 to flow through the permeate-port-defining zones 326*a*, 326*b* to flow out of the cassette 300 through the permeate outlet path 306. Further in contrast, a feed seal 412 is positioned about the feed-port-defining zone 312 in the membrane 310, and a feed seal 432 is positioned about the feed-port-defining zone 332 in the permeate spacer 330 to prevent fluid communication between the feed inlet path 302 and the feed channel 325 and fluid flowing through the membrane 310 thereto (to prevent intermingling of the permeate P and the feedstream F which generally would adversely affect the composition/content of and/or lead to detrimental product loss to the permeate P). Similarly, and further in contrast with the seals of the feed spacer 320, a retentate seal 414 is positioned about the retentate-port-defining zone 314 in the membrane 310 and a retentate seal 434 is positioned about the retentate-port-defining zone 334 in the permeate spacer 330 to prevent fluid communication between the retentate outlet path 304 and the feed channel 325 (to prevent intermingling of the retentate R with the permeate P which generally would adversely affect the composition/content of and/or lead to detrimental product loss to the permeate P).

To facilitate and/or simplify the formation of seals about different port-defining zones as described above, in accordance with various principles of the present disclosure, seals may be formed along the feed-port-defining zones and the retentate-port-defining zones in the permeate spacers, and such permeate spacers may then be stacked with feed spacers and a seal may then be formed about the perimeter of stacked layers of spacers and membranes to form a sealed cassette. In some embodiments, membranes are layered with the permeate spacers as seals are formed along the feed-port-defining zones and the retentate-port-defining zones of the permeate spacers. The sealant (e.g., a sealing material such as described above) may also form seals about the feed-port-defining zones and the retentate-port-defining zones of the membranes, as well as bond the permeate spacers and the membranes together into a permeate channel packet. The permeate spacers (with seals formed thereon) and membranes (optionally sealed with the permeate spacers into permeate channel packets) are then stacked with feed spacers and a seal may then be formed about the perimeter of stacked layers of spacers and membranes to form a sealed cassette. The sealant in the region of permeate-port-defining zones of the permeate spacers (and optionally also around the permeate-port-defining zone of the membranes) is then removed to open the permeate channels to the permeate outlet path formed between the permeate-port-defining zones and the interior of the filtration assembly housing. In some embodiments, a seal is prevented from being formed about the permeate-port-defining zones of the permeate spacers (and optionally also the membranes) when the seal is formed about the permeate-port-defining zones of the feed spacers.

Examples of embodiments of equipment which may be used to perform the above-described sealing of the spacers (and optionally membranes) of a cassette formed in accordance with various principles of the present disclosure are illustrated in FIG. 14 and FIG. 15, the use of which examples of embodiments of equipment will be described with reference to the flow chart of FIG. 16 (describing formation of a cassette in accordance with various principles of the present disclosure without necessarily using the equipment illustrated in FIG. 14 and FIG. 15).

Membranes 310 and spacers 320, 330 used to form a cassette 300 in accordance with various principles of the present disclosure, and optional gaskets 400 and release layers 540 (as described in further detail below) may be formed into the desired shape in any of a number of manners known to those of ordinary skill in the art (e.g., die cut, laser cut, etc., from a larger layer, or otherwise, or initially formed in the desired shape without), such as corresponding with steps 1000, 1002, 1004, 1006, 1008 in FIG. 16. As discussed above, the shape (e.g., outer perimeter) of the various layers of the cassette 300 may generally follow the interior contour of the cassette housing 200 except along the regions at which the permeate-port-defining zones are to be defined for forming the permeate outlet path.

The feed spacers 320 and the permeate spacers 330 may be formed of a material which may be formable or supplied in sheet or film form and optionally precision cut (e.g., die cut, laser cut, machined, stamped, molded, etc.) to the desired size and shape, such materials including, without limitation, polypropylene, high density polyethylene (HDPE), low density polyethylene (LDPE), polysulfone, polyketones (PEEK), nylon, and PolyVinylidine DiFlouride (PVDF), and the like, including combinations and copolymers thereof. The feed spacers 320 and permeate spacers 330 optionally are or include screens, such as known to those of ordinary skill in the art, and define feed channels 325 and permeate channels 335 therethrough. The optional screens of the feed spacers 320 and permeate spacers 330 may have a woven, fibrous, spun, mesh, or the like, configuration formed of polypropylene, polyester, polyamide, nylon, polyetheretherketone (PEEK), or Teflon-based materials such as ethylene tetrafluoroethylene (ETFE), or the like, or blends or copolymers of any of these materials. The screens may be precision cut (e.g., die-cut, laser cut, machined, stamped, molded, etc.) to fit within an opening within the spacers in a manner known to those of ordinary skill in the art.

Optionally, an identifier (e.g., a tag or bar code or QR code or the like) is provided on one or more parts of the filtration assembly, as indicated in step 1001 in FIG. 16, at this and/or other stages of formation of the filtration assembly.

As illustrated in FIG. 14, at least one permeate spacer 330, and, optionally, one or more membranes 310 are positioned in a fixture 500, between an upper plate 510 and a lower plate 512 to create a seal about the feed-port-defining zone and retentate-port-defining zones thereof (e.g., as may be seen more clearly with reference to FIG. 13). The desired layers are stacked in the desired order within the fixture 500 of a first stage assembly, such as corresponding with step 1010 in FIG. 16. For instance, in the example of an embodiment illustrated in FIG. 14, a permeate spacer 330 is positioned between a pair of membranes 310 to form a permeate channel packet 350. However, in other embodiments, a permeate spacer 330 may be layered between a membrane 310 and a release layer 540 to define an end permeate channel (at the top or bottom of a cassette) to be sealed by a gasket 400 (see, e.g., FIG. 6 and FIG. 10). Alignment members 520 may be inserted through an alignment opening 508 in the upper plate 510 and into the clamp assembly opening 318, 338 defined in the membranes 310 and permeate spacers 330 to keep such layers aligned (with support clamp extensions 228 being used for alignment of the cassette 300 within the housing 200 during the final assembly of the filtration assembly 100). If an elongated clamp assembly 220 extends through the cassette 300, then a clamp assembly seal 418, 428, and 438 may be formed about a clamp assembly opening 318, 328, 338 of each of the membranes 310, feed spacers 320, and permeate spacers 330, respectively, to seal feedstream F from the interior of the housing 200. It will be appreciated that one or more such stacks (membrane 310 —permeate spacer 330—membrane 310) may be positioned within the fixture 500, such as with gaskets between each separate stack or packet to prevent bonding between separate stacks or packets. Release layers 540 may be positioned on either side of this stack (e.g., membrane 310 —permeate spacer 330—membrane 310) such as to isolate the spacers and membranes from the fixture 500.

The upper plate 510 and the lower plate 512 of the fixture 500 are brought closer together to tighten down on the stacked layers of permeate spacers 330 and membranes 310, such as corresponding with step 1011 in FIG. 16, to achieve the desired sealing as sealing material (e.g., in liquid form, as prepared per step 1022 in FIG. 16) is poured into sealant ports 502, 504 of the fixture 500 (a "first pour", such as in step 1020 in FIG. 16). The sealant port 502 is in fluid communication with the feed-port-defining zone 312, 332 via the feed inlet path 302 (see, e.g., FIG. 11 and FIG. 13) defined by the membranes 310 and the permeate spacers 330, so that liquid sealant poured therein forms feed seals 412, 432 around the perimeter of the respective feed-port-defining zone 312, 332. Similarly, the sealant port 504 is in fluid communication with the retentate-port-defining zone 314, 334 via the retentate outlet path 304 (see, e.g., FIG. 11 and FIG. 13) defined by the membranes 310 and the permeate spacers 330, respectively, so that liquid sealant poured therein wicks or wets the permeate spacers 330 and membranes 310 in the region of the respective feed-port-defining zones 322, 312 and retentate-port-defining zones 324, 314 to form a retentate seal 434, 414 around the perimeter of the respective feed-port-defining zones 322, 312 and a retentate seal 434, 414 around the perimeter of the respective retentate-port-defining zone 314, 334. In some embodiments, vacuum pressure is applied from outside the stack of permeate spacers 330 and membranes 310 to cause the sealing material to be drawn through the layers laterally (e.g., radially outwardly) from the feed inlet path 302 defined by the feed-port-defining zones 312, 322) and retentate outlet path 304 (defined by the retentate-port-defining zones 314, 324 to form the seals. As described above, the sealant may also bond the layers together (e.g., upon curing). In some embodiments, sealing material (e.g., in liquid form, as prepared per step 1022 in FIG. 16) is poured into the alignment opening 508 of the fixture 500, and the vacuum pressure applied from outside the stack of permeate spacers 330 and membranes 310 causes the sealing material to wet through the layers laterally (e.g., radially outwardly) from the alignment opening 508 to create clamp assembly seals 418, 438 about the clamp assembly opening 318, 338 defined in the membranes 310 and permeate spacers 330, respectively.

The thus-formed permeate channel packet 350 may then be loaded into the fixture 600 of a second stage assembly and layered with feed spacers 320, as illustrated in FIG. 15, such as corresponding with step 1030 in FIG. 16. It will be appreciated that any number of layers of membranes and spacers (e.g., permeate channel packets 350 and feed spacers 320) may be positioned within the fixture 600, between the upper plate 610 and the lower plate 612 of the fixture 600 (such as corresponding with steps 1032, 1034, 1036 in FIG. 16) to form a cassette in accordance with various principles of the present disclosure. Alignment members 620 may be inserted through an alignment opening 608 in the upper plate 610 and into the clamp assembly openings 318, 328, 338 defined in the membranes 310 and spacers 320, 330 to keep such layers aligned.

The fixture 600 is then enclosed in a fluid-tight manner (e.g., positioned within a fluid impermeable container and/or wrapped with a fluid impermeable material) and sealing material (e.g., in liquid form, as prepared per step 1042 in FIG. 16) is poured around the perimeter of the stacked layers of membranes and spacers (a "second pour", such as in step 1040 in FIG. 16). The sealing material poured around the perimeter of the stacked layers wicks or wets the perimeter of at least the feed spacers 320 to form permeate seals 426 along at least the permeate-port-defining zones 326a, 326b of the feed spacers 320. In some embodiments, vacuum pressure is applied within the stacked layers of membranes and spacers (e.g., through the alignment opening 608) to draw the sealing material through the layers inwardly from the perimeter of the stacked layers to create at least the permeate seals 426 along at least the permeate-port-defining zones 326a, 326b of the feed spacers 320. In some embodiments, sealing material (e.g., in liquid form, as prepared per step 1042 in FIG. 16) is poured into the alignment opening 608 of the fixture 600, and vacuum pressure is applied (e.g., through the feed inlet path 302 and the retentate outlet path 304 extending through the feed spacers 320) to create clamp assembly seals 428 about the clamp assembly openings 328 defined in the feed spacers 320.

Once sealing material has been applied about the perimeter of the stack of layers of membranes and spacers, and cured, the encapsulated cassette is almost complete. Unless the sealing material has been blocked from forming seals around the permeate-port-defining zones 336a, 336b of the permeate spacers 330, any sealing material in such zones must be removed (such as corresponding with step 1050 in FIG. 16) to allow such zones to form/communicate with the permeate outlet paths 306a, 306b to be formed between the perimeter of the otherwise sealed cassette 300 and the interior 215 of the housing 200 (see, e.g., FIG. 11). In some embodiments, a thin layer of sealing material is applied to the permeate-port-defining zones 336a, 336b of the permeate spacers 330/permeate channel packets 350 to restrict further sealing material from wicking into or being drawn into (e.g., by vacuum pressure) when sealing material is applied about the perimeter of the stacked layers forming the cassette during the second pour (corresponding to step 1040). The sides of the cassette 300 forming the permeate outlet path 306 with the interior 215 of the housing 200 may be cut to remove the thin layer of sealing material along the permeate-port-defining zones 336a, 336b of the permeate spacers 330/permeate channel packets 350 and thereby to open the permeate-port-defining zones 336a, 336b to be in fluid communication with the permeate outlet path 306.

As previously described herein, in use, the lock ring 210 holds the cassette 300 in place between the housing top 212 and the housing bottom 214. During assembly, the cassette 300 may be compressed in order to form a seal and allow the flow paths to remain isolated when moving fluid(s) in and out of the cassette 300. This compression may be accomplished by placing the entire assembly in a press or clamp and compressing the stack. Once the desired force is applied, the lock ring 210 and connectors 226 are tightened. The assembly may then be removed from the clamp. Thereafter, the cassette 300 remains under compression and is ready for use.

Figure 18:
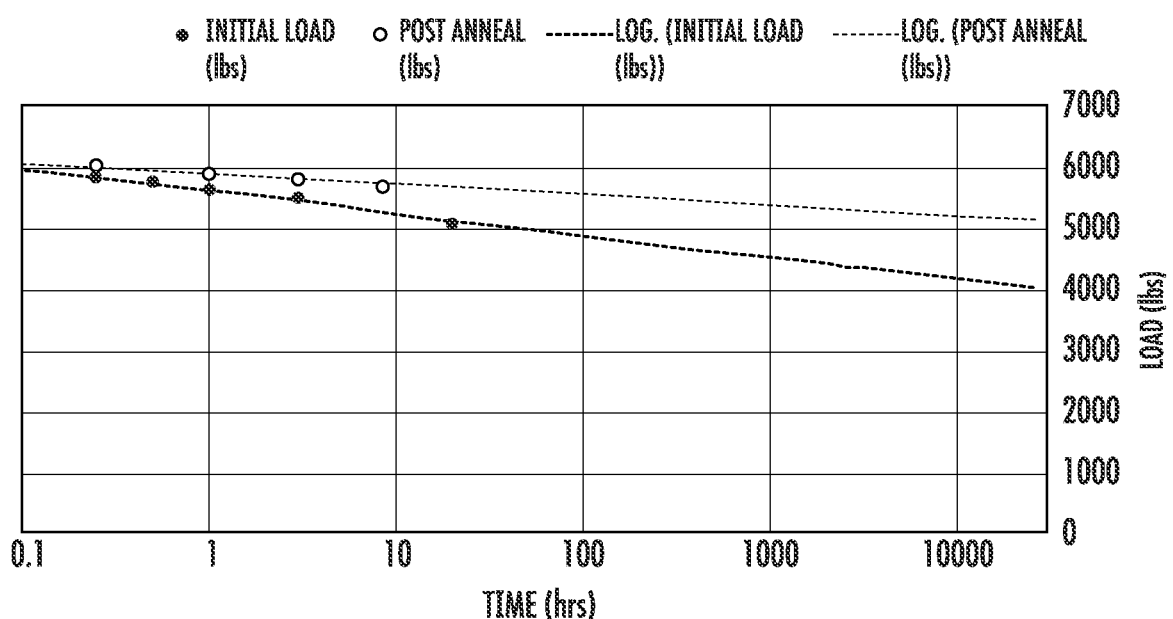
FIG. 18 is a graph illustrating the advantages associated with annealing and re-clamping the housing as part of the assembly process.
Figure 19:
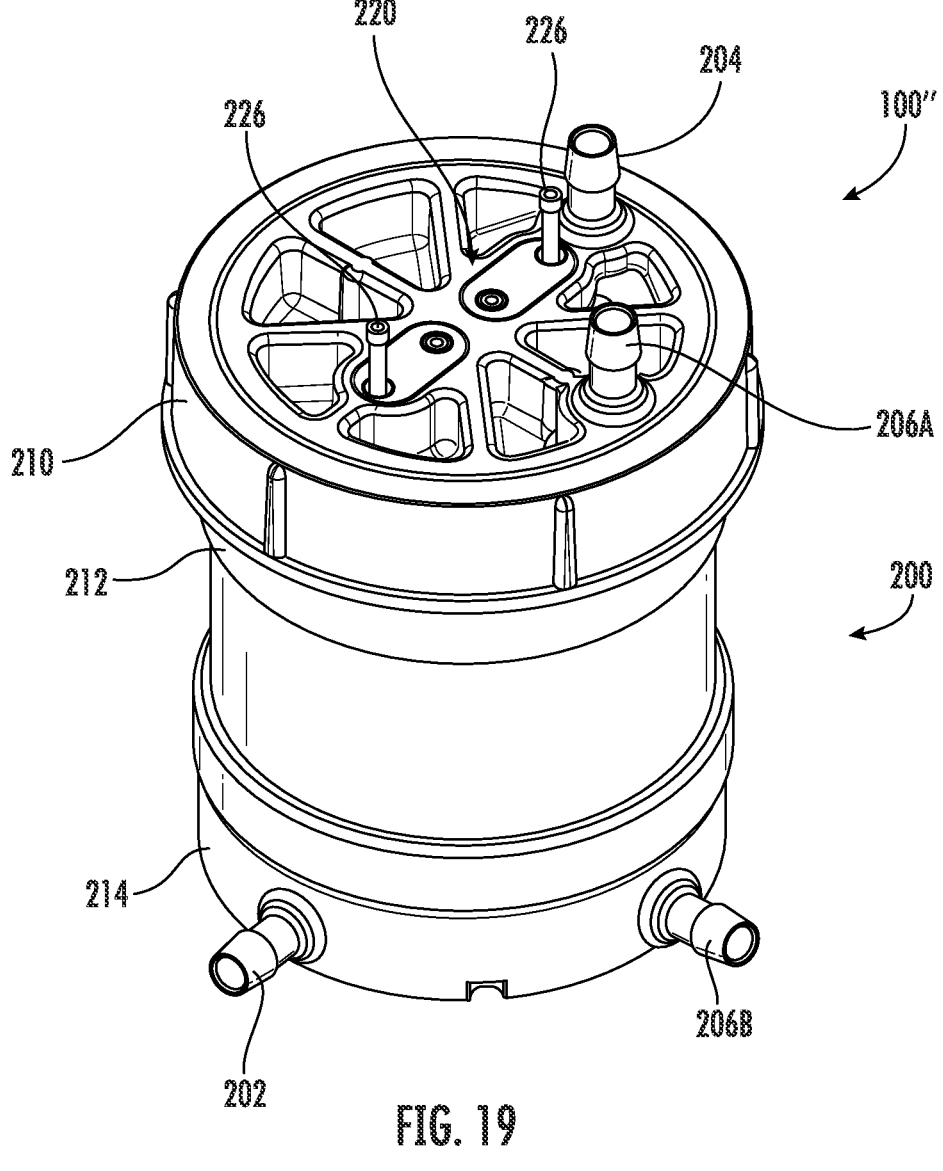
FIG. 19 illustrates a perspective view of an alternate example of an embodiment of a self-contained filtration assembly formed in accordance with aspects of the present disclosure.
Figure 20:
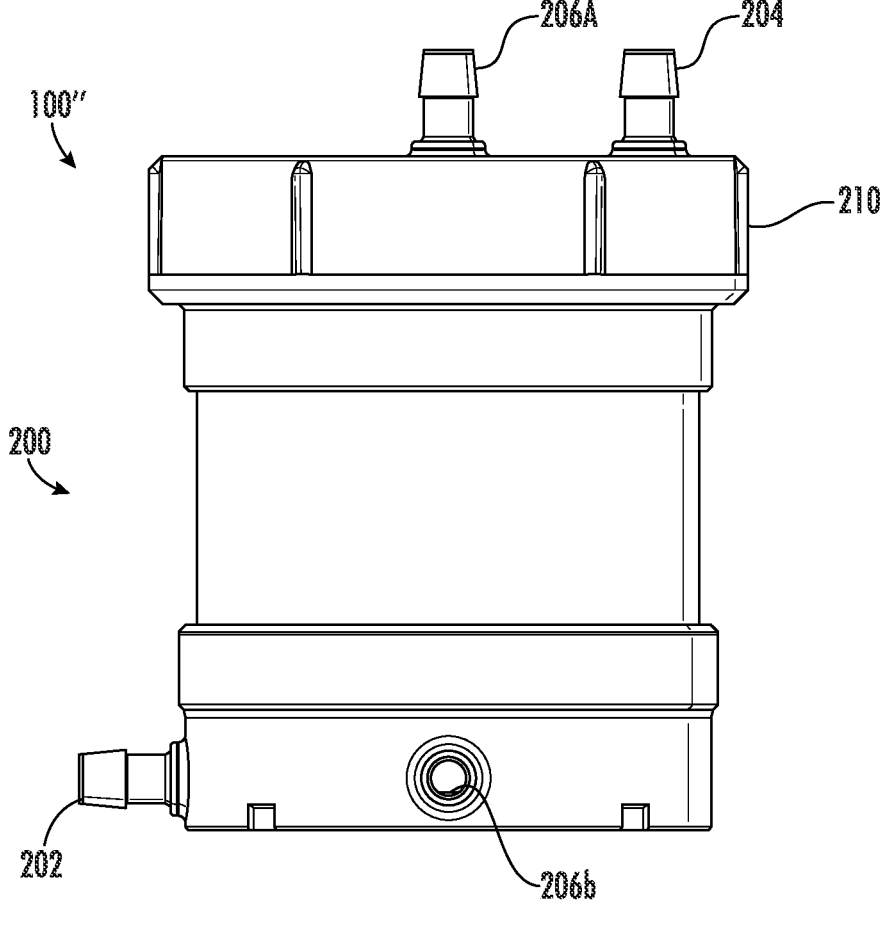
FIG. 20 illustrates a side view of the self-contained filtration assembly as illustrated in FIG. 19.
Figure 21:
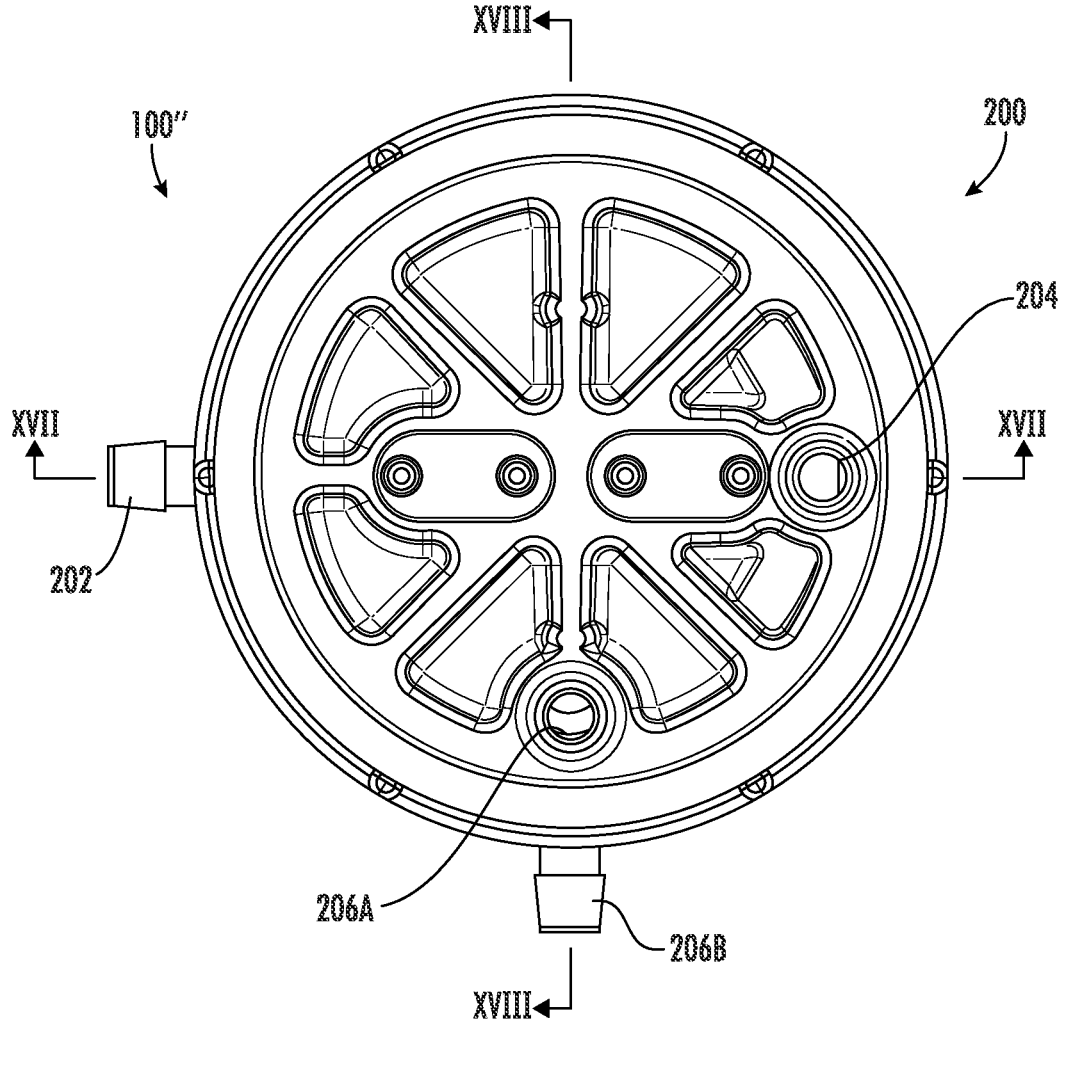
FIG. 21 illustrates a top view of the self-contained filtration assembly as illustrated in FIG. 19.
Figure 22:
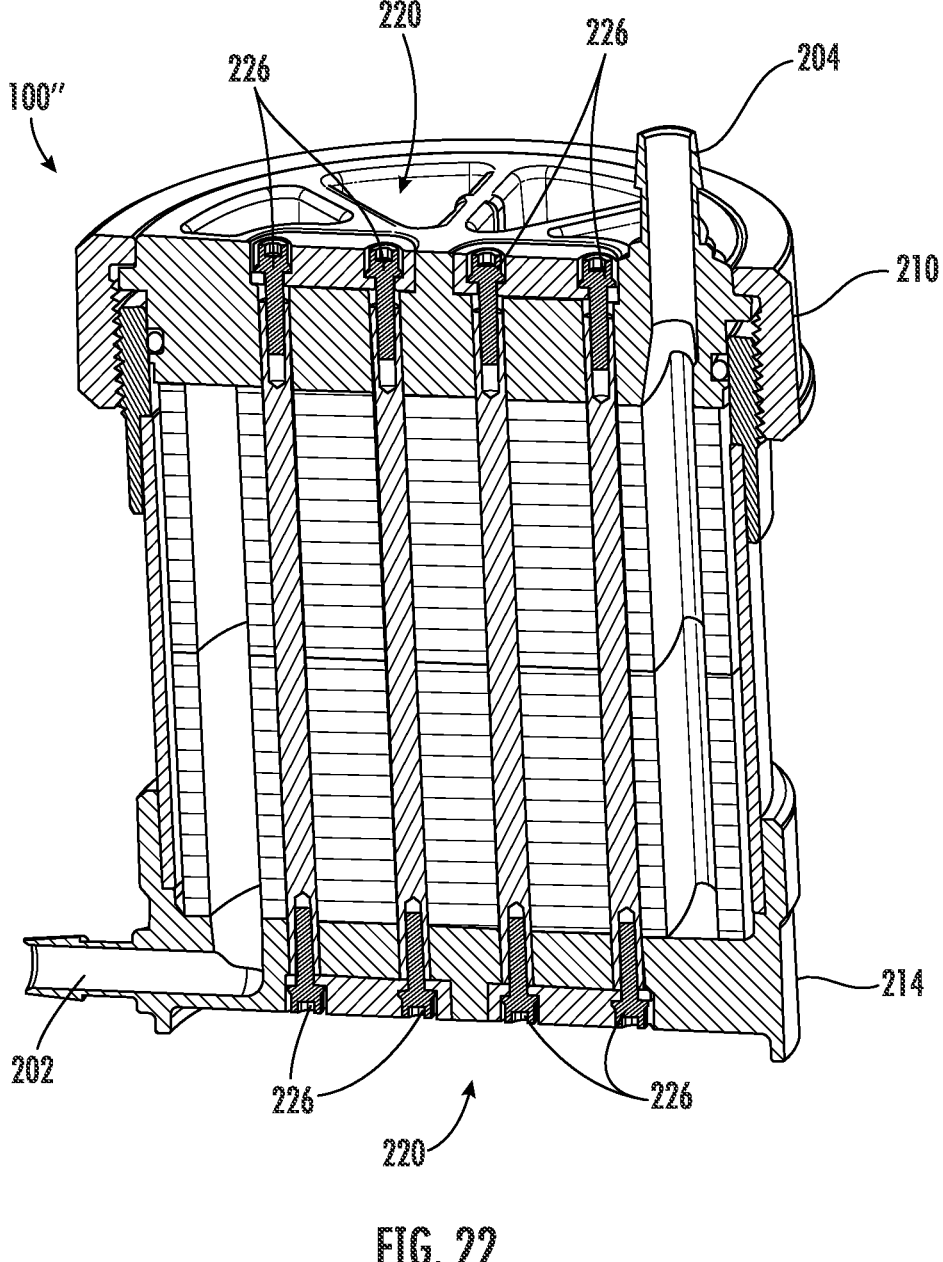
FIG. 22 illustrates a cross-sectional view along line XXII-XXII of FIG. 21.
Figure 23:
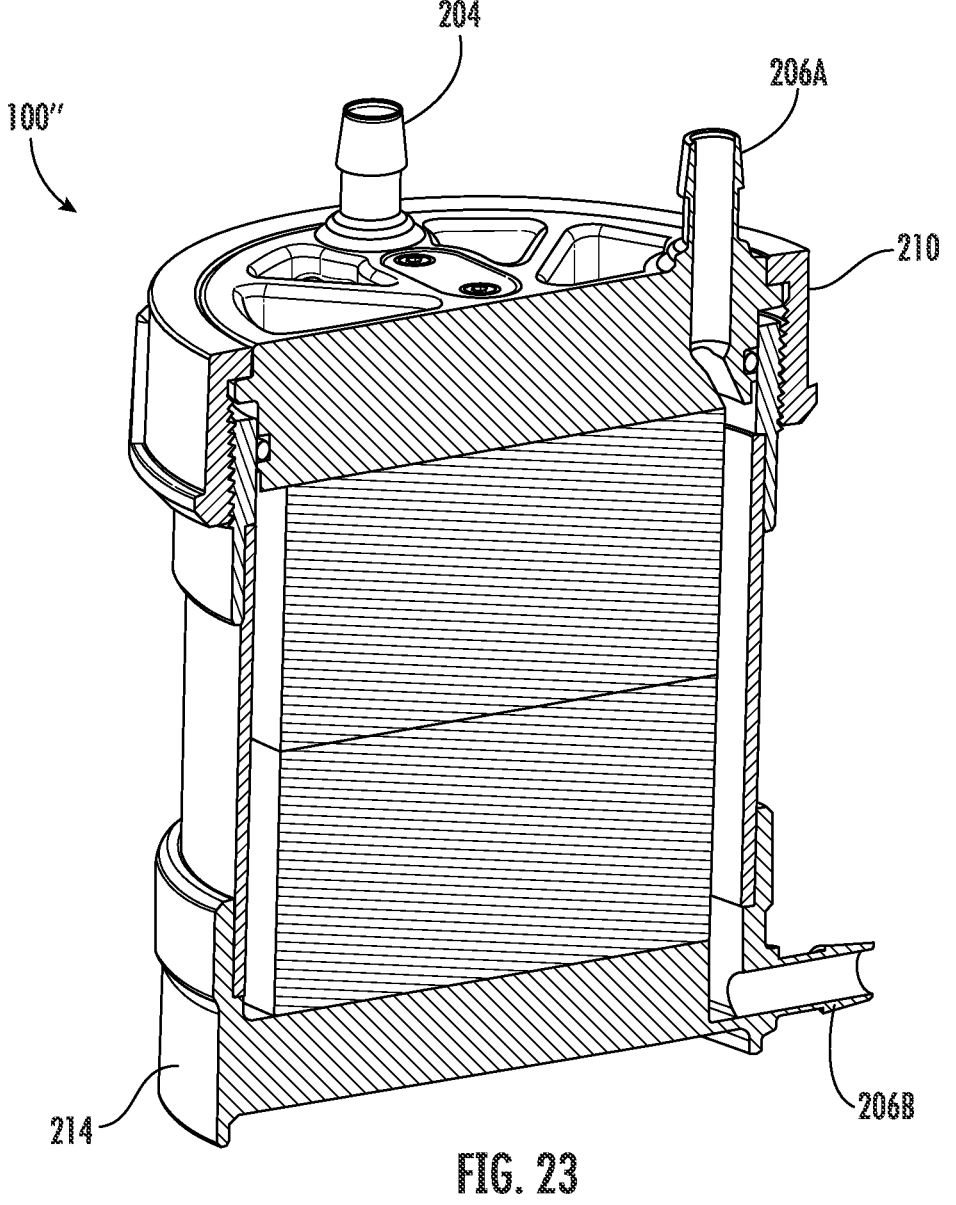
FIG. 23 illustrates a cross-sectional view along line XXIII-XXIII of FIG. 21.
Figure 24:
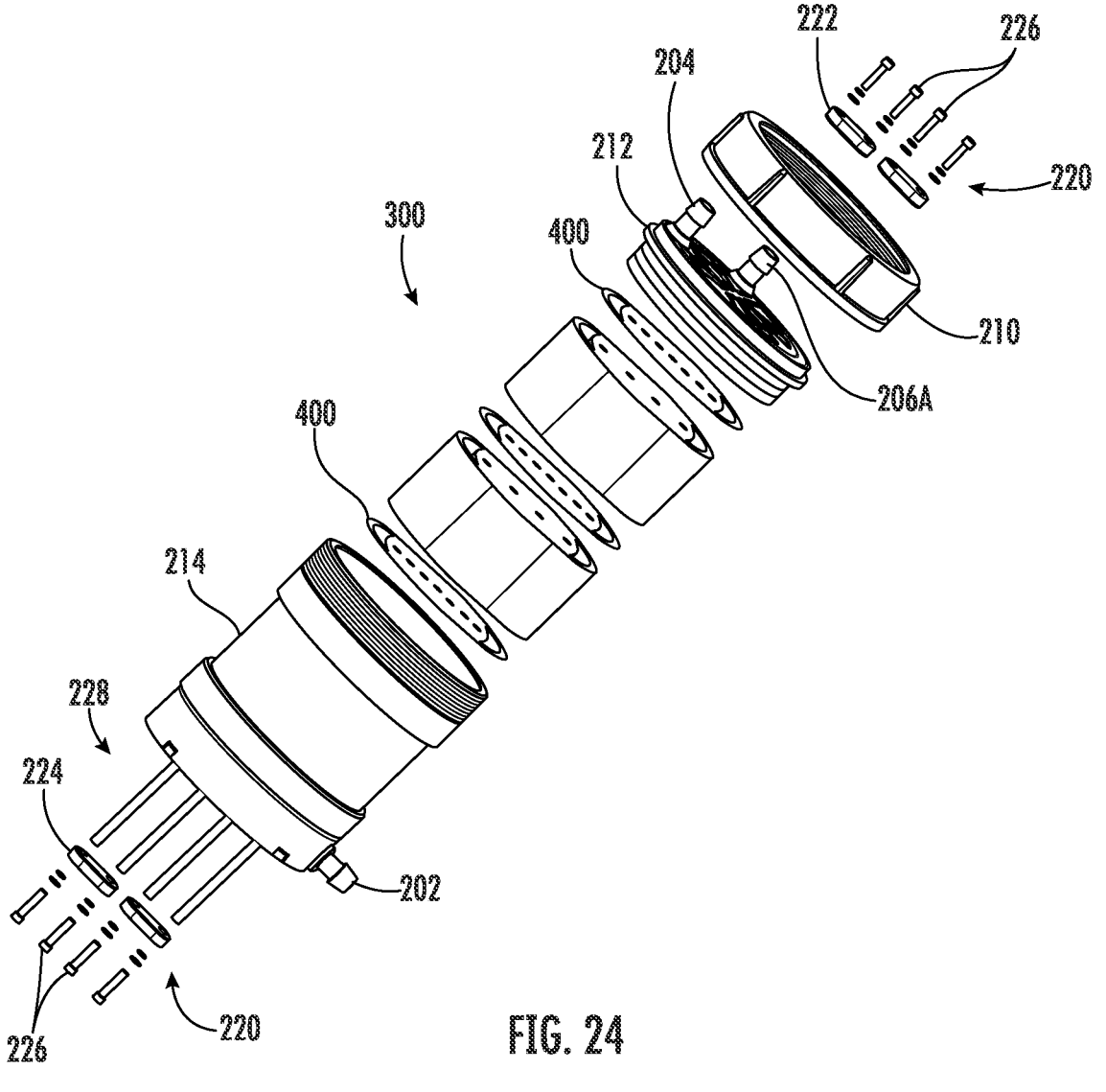
FIG. 24 illustrates an exploded view of the self-contained filtration assembly as illustrated in FIG. 19.

One area of concern with this assembly process is the formation of creep within the assembly such as, for example, between the cassette 300 and the housing bottom 214, due to the high forces (e.g., approximately 8,000 lbs. of force) pushing against the inner faces of the cassette 300 and the housing bottom 214. To improve the long term integrity of the seal, an adhesive may be used to hold the cassette 300 and the housing bottom 214 in place post-compression. However, in accordance with one or more features of the present disclosure, it has been discovered that if the assembly was annealed after the initial clamping, or after some period of time during which creep was experienced, the housing 200 could be placed back into the press or clamp for recompressing and the lock ring 210 and connectors 226 can be retightened. Thus arranged, it has been discovered that a significant reduction in creep following the annealing/reclamping process is achieved (FIG. 18). As shown, the post anneal slope is much shallower than following the initial load. Thus, by utilizing a threaded lock ring 210, re-compression of the housing 200 and re-tightening of the lock ring 210 is enabled as part of the assembly process.

Figure 17:
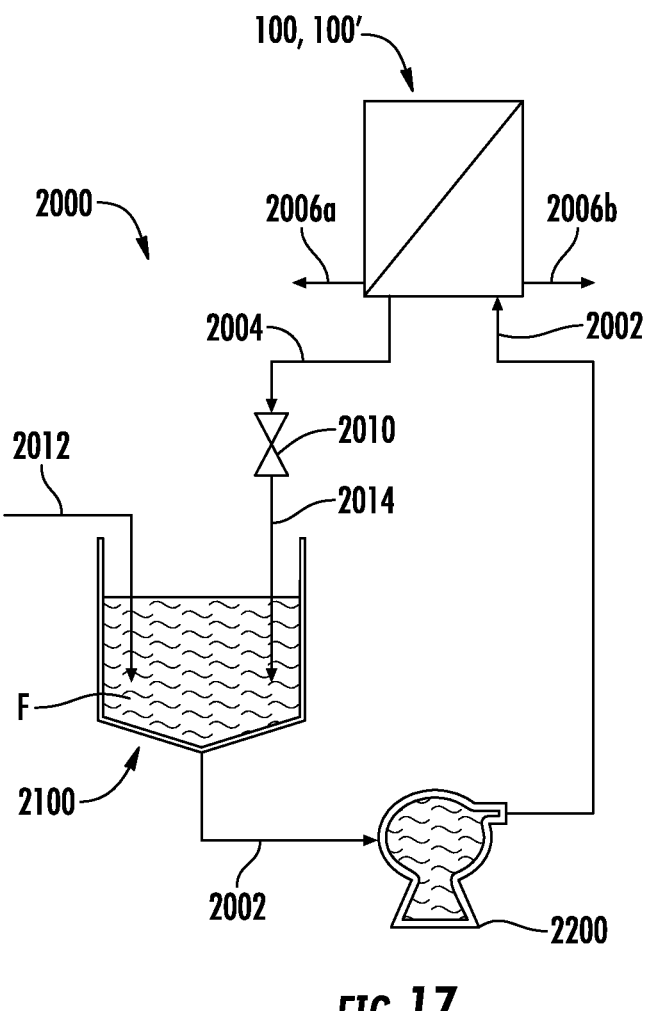
FIG. 17 is a schematic illustration of a system in which a self-contained filtration assembly formed in accordance with various principles of the present disclosure may be used.

A filtration assembly 100, 100' formed in accordance with various principles of the present disclosure can be suitably included in a system 2000 such as a bioprocessing system, one embodiment of which is illustrated schematically in FIG. 17. Feedstream F may be fed from a feed tank 2100 into the filtration assembly 100, 100'. Optionally, the feedstream F is pumped by a pump 2200 (e.g., a peristaltic pump), which may be inserted along the feed line 2002 between the feed tank 2100 into the filtration assembly 100, 100'. The filtrate exits the filtration assembly 100, 100' along filtrate lines 2006a, 2006b, while the retentate exits the filtration assembly 100, 100' along a retentate line 2004. The retentate may be returned to the feed tank 2100 through a valve 2010 and retentate return line 2014. Additionally, or alternatively, the retentate can flow to a separate retentate collection tank (not shown). Optionally, the feed tank 2100 may be filled (e.g., with additional feedstream F) via a further feed line 2012. Those of ordinary skill in the art will recognize further alternative system configurations in which the filtration device can be used with various accompanying advantages.

For various applications, operational flow rates for the feed may be from about 0.01 liter per minute per ft$^2$ of membrane ("(L/min)/ft$^2$") to 10 (L/min)/ft$^2$. It is presently contemplated that for a 100 ft$^2$ system, the flow rate may be from about 1 L/min to 1000 L/min, preferably from about 10 L/min to 100 L/min, and more preferably from about 50 L/min to 70 L/min. In some embodiments, a system that flows feedstream over two filtration assemblies 100, 100' may have a flow rate from about 1 L/min to 700 L/min, preferably from about 7 L/min to 70 L/min, and more preferably from about 30 L/min to 50 L/min. It is contemplated that the operating pressure on the feed side can be less than about 120 psi (about 830 kPa), preferably less than about 60 psi (about 415 kPa), and more preferably less than about 20-50 psi (about 140-350 kPa).

Other features and structures of the example of an embodiment of a filtration assembly 100" illustrated in FIGS. 19-27 may be substantially the same as corresponding features and structure of the example of an embodiment of a filtration assembly 100 illustrated in FIG. 1, FIG. 2, FIG. 4, FIG. 5, and FIG. 6 and filtration assembly 100' illustrated in FIG. 7, FIG. 8, FIG. 9, and FIG. 10. The common features and structures are thus indicated with the same reference numerals, and, simply for the sake of brevity, reference is made to the above descriptions of such elements.

As illustrated, the primary difference in connection with filtration assembly 100" illustrated in FIGS. 19-27 is that the retentate outlet port 204 and permeate outlet port 206 (e.g., permeate outlet port 206A) protrude from the top of the housing as opposed to the side as previously shown. Thus arranged, the lock ring 210 fits around the entire assembly. In addition, the overall height of the housing top 212 may be reduced without the retentate outlet port 204 and the permeate outlet port 206A extending through the side of the filtration assembly 100". Moreover, in connection with the filtration assembly 100 and filtration assembly 100' previously described, in use, the lock ring 210 is arranged and configured to interfere with barbs (or fittings) associated with the retentate outlet port 204 and the permeate outlet port 206A on the housing top 212. Thus arranged, the barbs were bonded after the lock ring 210 was placed over the housing top 212. By extending the retentate outlet port 204 and the permeate outlet port 206A from the top of the housing, the retentate outlet port 204 and the permeate outlet port 206A face or extend upwards, which allows the barb (or fitting) to be an integral part of the housing top 212.

Figure 25:
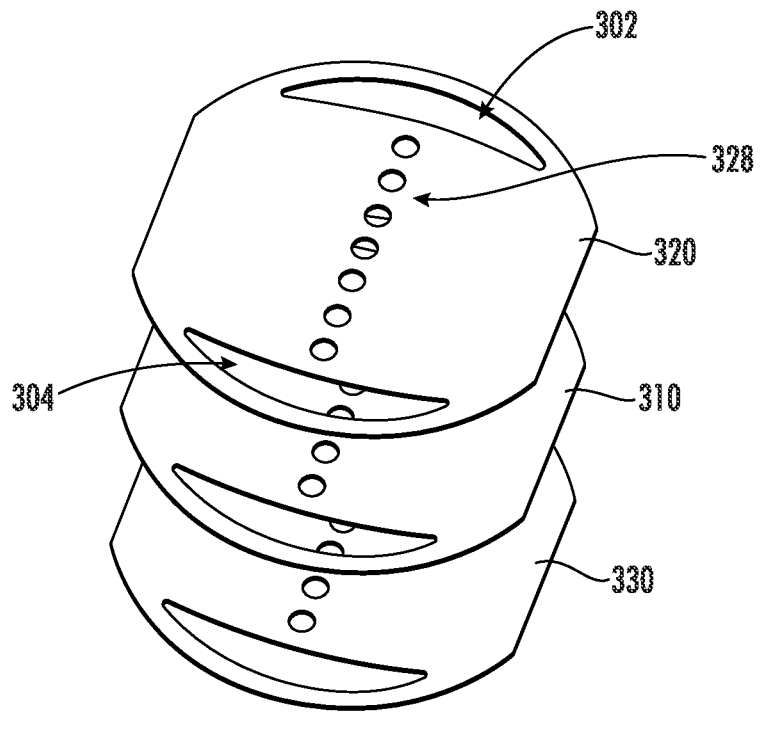
FIG. 25 illustrates an exploded view of layers of an example of an embodiment of a tangential flow filtration cassette formed in accordance with various principles of the present disclosure.
Figure 26:
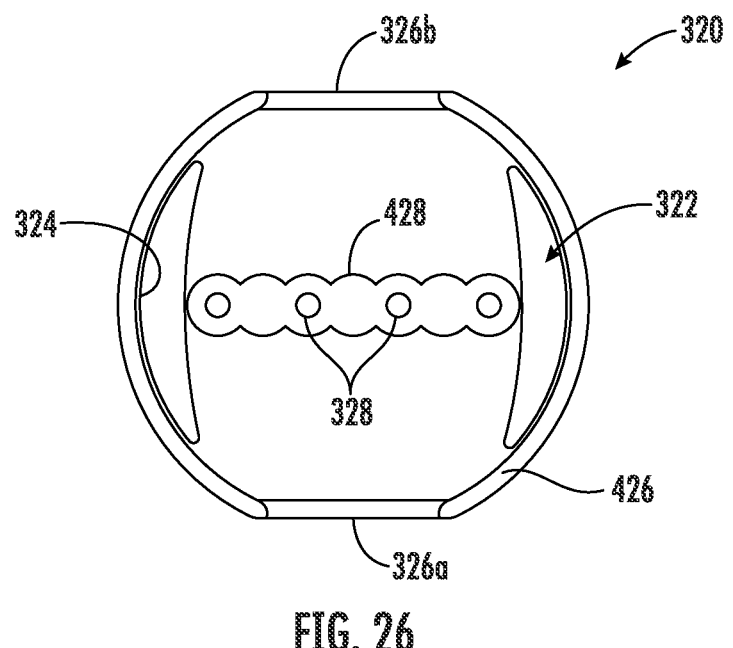
FIG. 26 is a plan view of feed spacer as in FIG. 25.
Figure 27:
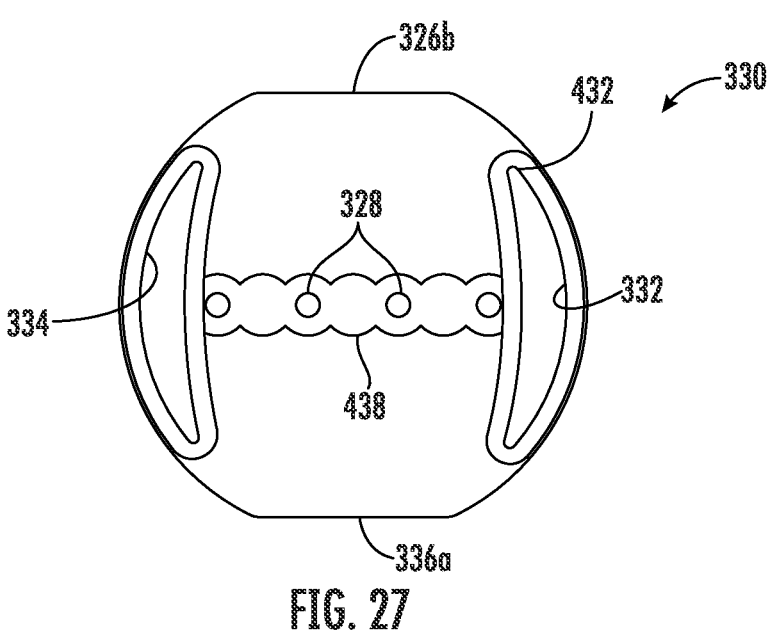
FIG. 27 is a plan view of a permeate spacer as in FIG. 25.

In addition, as illustrated in FIGS. 25-27, the feed inlet path 302, the retentate outlet path 304, and the clamp assembly openings 328 may have alternate suitable shapes. For example, the clamp assembly openings 328 may comprise a plurality of openings or holes as opposed to an elongated slot. For example, as illustrated, in some embodiments, the clamp assembly openings 328 may comprise seven distinct and separate holes as opposed to an elongated slot as previously shown and described, although this is but one configuration and other configurations may be utilized.

In addition, and/or alternatively, as illustrated, the support clamp assembly 220 may include a top support clamp 222, a bottom support clamp 224, and connectors 226 (such as, without limitation, bolts, screws, etc.), and one or more support clamp extensions 228 extending through the layers of the cassette between the top support clamp 222 and the bottom support clamp 224 (as illustrated), although other configurations are within the scope and spirit of the present disclosure. In use, the top support clamp 222 and the bottom support clamp 224 may each comprise of multiple pieces or segments as opposed to a single integrated segment. In use, the connectors 226 may be coupled to a first or top end of the extensions 228 while additional connectors 226 may be coupled to a second or bottom end of the extensions 228.

In use, as previously described with reference to FIGS. 14-16, the membranes 310 and spacers 320, 330 may be used to form a cassette 300 in accordance with various principles of the present disclosure, and optional gaskets 400 and release layers 540 may be formed into the desired shape in any of a number of manners known to those of ordinary skill in the art, As previously described, in use, during a first stage (FIG. 14), a building or clamping fixture 500 may be used to form seals around the feed port and retentate port 502, 504. The clamping fixture 500 is used when making the cassette and bonds together the membrane 310 and permeate spacers 330 thus creating a permeate channel packet 350, which can be used during the next assembly step (2nd stage). As previously described, in use, during the second stage (FIG. 15), a building or clamping fixture 600 is used for forming seals around the perimeter of the cassette and around the center holes 328 as opposed to the center opening (e.g., slot) 338 as previously described. In connection with the first and second stages of the method for forming the cassette, the steps are substantially similar but for the shapes of the feed and retentate ports 502, 504 and the center opening (e.g., slot) 338 has been changed to a plurality of openings or holes to enable alignment of the cassette and constraining the assembly with Alignment members 520 (e.g., rods).

Various further benefits of the various aspects, features, components, and structures of a filtration assembly such as described above, in addition to those discussed above, may be appreciated by those of ordinary skill in the art.

The foregoing discussion has broad application and has been presented for purposes of illustration and description and is not intended to limit the disclosure to the form or forms disclosed herein. It will be understood that various additions, modifications, and substitutions may be made to embodiments disclosed herein without departing from the concept, spirit, and scope of the present disclosure. In particular, it will be clear to those skilled in the art that principles of the present disclosure may be embodied in other forms, structures, arrangements, proportions, and with other elements, materials, and components, without departing from the concept, spirit, or scope, or characteristics thereof. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. While the disclosure is presented in terms of embodiments, it should be appreciated that the various separate features of the present subject matter need not all be present in order to achieve at least some of the desired characteristics and/or benefits of the present subject matter or such individual features. One skilled in the art will appreciate that the disclosure may be used with many modifications or modifications of structure, arrangement, proportions, materials, components, and otherwise, used in the practice of the disclosure, which are particularly adapted to specific environments and operative requirements without departing from the principles or spirit or scope of the present disclosure. For example, elements shown as integrally formed may be constructed of multiple parts or elements shown as multiple parts may be integrally formed, the operation of elements may be reversed or otherwise varied, the size or dimensions of the elements may be varied. Similarly, while operations or actions or procedures are described in a particular order, this should not be understood as requiring such particular order, or that all operations or actions or procedures are to be performed, to achieve desirable results. Additionally, other implementations are within the scope of the following claims. In some cases, the actions recited in the claims can be performed in a different order and still achieve desirable results. The presently disclosed embodiments are therefore to be considered in all respects as illustrative and not restrictive, the scope of the claimed subject matter being indicated by the appended claims, and not limited to the foregoing description or particular embodiments or arrangements described or illustrated herein. In view of the foregoing, individual features of any embodiment may be used and can be claimed separately or in combination with features of that embodiment or any other embodiment, the scope of the subject matter being indicated by the appended claims, and not limited to the foregoing description.

In the foregoing description and the following claims, the following will be appreciated. The phrases "at least one", "one or more", and "and/or", as used herein, are open-ended expressions that are both conjunctive and disjunctive in operation. The terms "a", "an", "the", "first", "second", etc., do not preclude a plurality. For example, the term "a" or "an" entity, as used herein, refers to one or more of that entity. As such, the terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, counterclockwise, and/or the like) are only used for identification purposes to aid the reader's understanding of the present disclosure, and/or serve to distinguish regions of the associated elements from one another, and do not limit the associated element, particularly as to the position, orientation, or use of this disclosure. Connection references (e.g., attached, coupled, connected, engaged, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

The following claims are hereby incorporated into this Detailed Description by this reference, with each claim standing on its own as a separate embodiment of the present disclosure. In the claims, the term "comprises/comprising" does not exclude the presence of other elements, components, features, regions, integers, steps, operations, etc. Additionally, although individual features may be included in different claims, these may possibly advantageously be combined, and the inclusion in different claims does not imply that a combination of features is not feasible and/or advantageous. In addition, singular references do not exclude a plurality. Reference signs in the claims are provided merely as a clarifying example and shall not be construed as limiting the scope of the claims in any way.

What is claimed is:

1. A tangential flow filtration cassette having a first cassette end along an inlet of a feedstream into the tangential flow filtration cassette and a second cassette end along an outlet for permeate of the feedstream, said tangential flow filtration cassette comprising:

at least one membrane having a feed-port-defining zone adjacent the first cassette end, a retentate-port-defining zone adjacent the second cassette end, and a permeate-port-defining zone along the sides thereof between the first cassette end and the second cassette end;

at least one feed spacer defining a feed channel along an upstream side of said membrane, and having a feed-port-defining zone adjacent the first cassette end, a retentate-port-defining zone adjacent the second cassette end, and a permeate-port-defining zone along the sides thereof between the first end and the second end; and at least one permeate spacer defining a permeate channel along a downstream side of said membrane, and having a feed-port-defining zone adjacent the first cassette end and with sealant extending around the perimeter thereof, a retentate-port-defining zone adjacent the second cassette end thereof and with sealant extending around the perimeter thereof, and a permeate-port-defining zone along the sides thereof between the first end and the second end;

wherein:

each of said at least one membrane, said at least one feed spacer, and said at least one permeate spacer has substantially the same shape about their respective perimeters;

said feed-port-defining zones of said at least one membrane, said at least one feed spacer, and said at least one permeate spacer are aligned to define a feed inlet path extending along the first cassette end;

said retentate-port-defining zones of said at least one membrane, said at least one feed spacer, and said at least one permeate spacer are aligned to define a retentate outlet path extending along the second cassette end;

said permeate-port-defining zones of said at least one membrane, said at least one feed spacer, and said at least one permeate spacer are aligned to define a permeate outlet path extending along at least one of the sides of said tangential flow filtration cassette between the first cassette end and the second cassette end;

a sealant extends around the perimeter of said at least one feed spacer to fluidly isolate feed channels from permeate channels within said tangential flow filtration cassette, whereas the permeate-port-defining zones of said at least one permeate spacer are unsealed and in fluid communication with the permeate outlet path;

the tangential flow filtration cassette defines a flow path between the feed-port-defining zones and the retentate-port-defining zones; and a clamp assembly extends through a housing that houses the tangential flow filtration cassette and said tangential flow filtration cassette, the clamp assembly having a cross-sectional shape elongated in the direction of the flow path through said tangential flow filtration cassette.

2. The tangential flow filtration cassette of claim 1, wherein said permeate-port-defining zones of said at least one feed spacer and said at least one permeate spacer are aligned to define a permeate outlet path extending along each side of said tangential flow filtration cassette between the first cassette end and the second cassette end.

3. The tangential flow filtration cassette of claim 1, wherein each of said at least one membrane, said at least one feed spacer, and said at least one permeate spacer have a curved shape along the first cassette end and the second cassette end and are flat along the sides thereof extending between the first cassette end and the second cassette end.

4. The tangential flow filtration cassette of claim 1, wherein at least one of said spacers includes a screen.

5. The tangential flow filtration cassette of claim 1, wherein all membranes and spacers of said cassette are bonded together by an encapsulating sealant formed around said membranes and spacers with a portion of said encapsulating sealant removed from the sides of said permeate spacers to place the permeate channels in fluid communication with the permeate outlet paths along the sides of the tangential flow filtration cassette.

6. A tangential flow filtration assembly comprising:

a housing;

a tangential flow filtration cassette positioned within said housing and having a first end along an inlet of a feedstream into said tangential flow filtration cassette and a second end along an outlet for permeate of the feedstream from said tangential flow filtration cassette, and defining a flow path for feedstream flowing therethrough from the first end to the second end; and a clamp assembly extending through said housing and said tangential flow filtration cassette and having a cross-sectional shape elongated in the direction of the flow path through said tangential flow filtration cassette.

7. The tangential flow filtration assembly of claim 6, wherein said housing further comprises a housing top extending generally parallel to the flow path within said tangential flow filtration cassette, a housing bottom extending generally parallel to the flow path within said tangential flow filtration cassette, and a lock ring holding said housing top and said housing bottom together and defining a housing shell around the perimeter of said tangential flow filtration cassette, said clamp assembly holding said housing top and said housing bottom together.

8. The tangential flow filtration assembly of claim 6, wherein:

the first end of said tangential flow filtration cassette is shaped to correspond to the shape of the interior of said housing;

the second end of said tangential flow filtration cassette is shaped to correspond to the shape of the interior of said housing; and at least one of the sides of said tangential flow filtration cassette between the first end and the second end is spaced apart from the interior of said housing to define a permeate outlet path along the at least one side of said tangential flow filtration cassette between the exterior of said tangential flow filtration cassette and the interior of said housing.

9. The tangential flow filtration assembly of claim 8, wherein:

said housing has a generally circular or cross-section;

the first and second ends of said tangential flow filtration cassette are curved to correspond to the circular shape of the interior of said housing; and at least one of the sides of said tangential flow filtration cassette between the first end and the second end is not curved to correspond to the circular shape of the interior of said housing and thereby defines a permeate outlet path along the at least one side and between the exterior of said tangential flow filtration cassette and the interior of said housing.

10. The tangential flow filtration assembly of claim 8, wherein:

said tangential flow filtration cassette comprises a stack of at least one membrane, at least one feed spacer, and at least one permeate spacer layered to form said tangential flow filtration cassette;

a feed-port-defining zone is defined in each of said at least one membrane, said at least one feed spacer, and said at least one permeate spacer, along the first end of said tangential flow filtration cassette;

the feed-port-defining zones of said at least one membrane, said at least one feed spacer, and said at least one permeate spacer together define a feed inlet path through said tangential flow filtration cassette;

a retentate-port-defining zone is defined in each of said at least one membrane, said at least one feed spacer, and said at least one permeate spacer, along the second end of said tangential flow filtration cassette;

the retentate-port-defining zones of said at least one membrane, said at least one feed spacer, and said at least one permeate spacer together define a retentate outlet path through said tangential flow filtration cassette;

a permeate-port-defining zone is defined along said at least one side of each of said at least one membrane, said at least one feed spacer, and said at least one permeate spacer spaced apart from the interior of said housing, between the first end and the second end of said tangential flow filtration cassette; and the permeate-port-defining zones of said at least one membrane, said at least one feed spacer, and said at least one permeate spacer together define a permeate outlet path between the exterior of said tangential flow filtration cassette and the interior of said housing.

11. The tangential flow filtration assembly of claim 6, wherein:

said tangential flow filtration cassette comprises a stack of at least one membrane, at least one feed spacer, and at least one permeate spacer layered to form said tangential flow filtration cassette;

a feed-port-defining zone is defined in each of said at least one membrane, said at least one feed spacer, and said at least one permeate spacer, along the first end of said tangential flow filtration cassette;

the feed-port-defining zones of said at least one membrane, said at least one feed spacer, and said at least one permeate spacer together define a feed inlet path through said tangential flow filtration cassette;

a retentate-port-defining zone is defined in each of said at least one membrane, said at least one feed spacer, and said at least one permeate spacer, along the second end of said tangential flow filtration cassette;

the retentate-port-defining zones of said at least one membrane, said at least one feed spacer, and said at least one permeate spacer together define a retentate outlet path through said tangential flow filtration cassette;

a permeate-port-defining zone is defined along at least one side of each of said at least one membrane, said at least one feed spacer, and said at least one permeate spacer, extending between the first end and the second end of said tangential flow filtration cassette and spaced apart from the interior of said housing; and the permeate-port-defining zones of said at least one membrane, said at least one feed spacer, and said at least one permeate spacer together define a permeate outlet path between the exterior of said tangential flow filtration cassette and the interior of said housing.

12. The tangential flow filtration assembly of claim 6, wherein:

said housing has a generally circular cross-section;

said tangential flow filtration cassette comprises a stack of at least one membrane, at least one feed spacer, and at least one permeate spacer layered to form said tangential flow filtration cassette;

a feed-port-defining zone is defined in each of said at least one membrane, at least one feed spacer, and at least one permeate spacer, along the first end of said tangential flow filtration cassette;

a retentate-port-defining zone is defined in each of said at least one membrane, at least one feed spacer, and at least one permeate spacer, along the second end of said tangential flow filtration cassette; and at least one side of said tangential flow filtration cassette extending between the first and second ends of said tangential flow filtration cassette is spaced apart from the interior of said housing to define a permeate outlet path along the at least one side between the exterior of said tangential flow filtration cassette and the interior of said housing.

13. The tangential flow filtration assembly of claim 6, wherein at least one membrane, at least one feed spacer, and at least one permeate spacer are stacked within said tangen-tial flow filtration cassette with respective feed-port-defining zones, retentate-port-defining zones, and permeate-port-defining zones defined therein aligned to define, respectively, a feed inlet path along the first end of said tangential flow filtration cassette, a retentate outlet path along the second end of said tangential flow filtration cassette, and a permeate outlet path along one or both sides of said tangential flow filtration cassette between the first and second end thereof.

14. The tangential flow filtration assembly of claim 13, wherein the feed inlet path is in fluid communication with a feed inlet port in said housing, the retentate outlet path is in fluid communication with a retentate outlet port in said housing, and the permeate outlet path along one or both side of said tangential flow filtration cassette is in fluid communication with a respective permeate outlet port in said housing.

15. The tangential flow filtration assembly of claim 14, wherein at least one of said feed inlet port, said retentate outlet port, and said permeate outlet port is configured to be connected with a sanitary connector and coupled with a fluid line for supplying feedstream to said tangential flow filtration cassette or removing retentate or permeate from said tangential flow filtration cassette.

16. The tangential flow filtration assembly of claim 6, wherein said housing includes a feed inlet port, a retentate outlet port, and at least one permeate outlet port, each of which is configured to be coupled directly with sanitary couplers and feed lines to feed feedstream into said tangential flow filtration cassette or remove retentate or permeate from said tangential flow filtration cassette.

17. The tangential flow filtration assembly of claim 6, wherein said housing has a circular cross-section.

\* \* \* \* \*